United States Patent
Nakayama et al.

(10) Patent No.: US 9,641,022 B2
(45) Date of Patent: May 2, 2017

(54) POWER SUPPLY APPARATUS, BATTERY APPARATUS, AND BATTERY SYSTEM

(71) Applicant: JGC CORPORATION, Tokyo (JP)

(72) Inventors: Tomonori Nakayama, Ibaraki (JP); Masayoshi Ishida, Ibaraki (JP); Hiroaki Hasegawa, Kanagawa (JP); Kazutaka Hiraoka, Kanagawa (JP); Toshiyuki Nagai, Kanagawa (JP); Nobuo Kakizaki, Kanagawa (JP)

(73) Assignee: JGC CORPORATION, Tokyo (JP)

( * ) Notice: Subject to any disclaimer, the term of this patent is extended or adjusted under 35 U.S.C. 154(b) by 157 days.

(21) Appl. No.: 14/381,591

(22) PCT Filed: Mar. 4, 2013

(86) PCT No.: PCT/JP2013/055892
§ 371 (c)(1),
(2) Date: Aug. 27, 2014

(87) PCT Pub. No.: WO2013/129683
PCT Pub. Date: Sep. 6, 2013

(65) Prior Publication Data
US 2015/0028796 A1 Jan. 29, 2015

(30) Foreign Application Priority Data
Mar. 2, 2012 (JP) .................. 2012-047083

(51) Int. Cl.
*H02J 7/00* (2006.01)
*H02J 7/35* (2006.01)
(Continued)

(52) U.S. Cl.
CPC ............ *H02J 7/35* (2013.01); *H01M 10/44* (2013.01); *H01M 10/48* (2013.01); *H02J 7/345* (2013.01);
(Continued)

(58) Field of Classification Search
CPC . H02J 7/35; H02J 7/355; Y02E 60/12; H01M 10/465; H01M 16/006
(Continued)

(56) References Cited

U.S. PATENT DOCUMENTS

2002/0195989 A1* 12/2002 Teramoto .................. F03D 1/04
320/101
2003/0011343 A1* 1/2003 Hobelsberger ...... H01M 10/465
320/101
(Continued)

FOREIGN PATENT DOCUMENTS

CN 101087069 12/2007
JP 2000-278883 10/2000
(Continued)

OTHER PUBLICATIONS

"Extended European Search Report of European Counterpart Application", issued on Nov. 27, 2015, pp. 1-13.
(Continued)

*Primary Examiner* — Arun Williams
(74) *Attorney, Agent, or Firm* — Jianq Chyun IP Office

(57) ABSTRACT

A power supply apparatus that receives electric power from a power generation apparatus having a varying output and supplies electric power to an outside, the apparatus comprising: a power storage device that has a larger amount by which electric power is stored and/or a lower self-discharge rate than a capacitor device used as a passive device and also has higher charge and discharge efficiency and/or higher responsiveness than a secondary battery, the power storage device receiving electric power from the power generation apparatus and discharging electric power to the outside; a current control unit that controls a current supplied from the power storage device to the outside; and a control unit that controls a current and a voltage of the power generation apparatus by charging and discharging the power storage device so as to maximize an amount of power generation by the power generation apparatus.

12 Claims, 17 Drawing Sheets

(51) Int. Cl.
*H01M 10/44* (2006.01)
*H01M 10/48* (2006.01)
*H02J 7/34* (2006.01)
*H02J 3/38* (2006.01)

(52) U.S. Cl.
CPC .............. *H02J 3/385* (2013.01); *Y02E 10/58* (2013.01); *Y02E 70/40* (2013.01)

(58) Field of Classification Search
USPC ........................................................ 320/101
See application file for complete search history.

(56) References Cited

U.S. PATENT DOCUMENTS

| | | | |
|---|---|---|---|
| 2008/0231231 | A1 | 9/2008 | Hartzog |
| 2009/0278504 | A1* | 11/2009 | Tsubota ................... A61B 6/00 320/152 |
| 2010/0289337 | A1 | 11/2010 | Stauth et al. |
| 2011/0199042 | A1* | 8/2011 | Abe ................. H01M 10/3909 320/101 |
| 2011/0227540 | A1 | 9/2011 | Kanoh et al. |

FOREIGN PATENT DOCUMENTS

| | | |
|---|---|---|
| JP | 2001-135837 | 5/2001 |
| JP | 2003-339118 | 11/2003 |
| JP | 2005-020805 | 1/2005 |
| JP | 2009-142071 | 6/2009 |
| JP | 2010-004587 | 1/2010 |
| JP | 2010-231456 | 10/2010 |
| JP | 2012-009714 | 1/2012 |
| WO | 2011/118771 | 9/2011 |

OTHER PUBLICATIONS

Shimizu et al., "A Photovoltaic Generation System with Improvement of Power Degradation Caused by Non-Uniform Insolation", The Transaction of Institute of Electrical Engineers of Japan, Apr. 1, 2006, pp. 92-93, vol. 126.

"International Search Report (Form PCT/ISA/210)", mailed on Apr. 23, 2013, pp. 1-4.

"Office Action of China Counterpart Application," issued on Feb. 14, 2016, with English translation thereof, p. 1-p. 14.

"Second Office Action of China Counterpart Application" with English translation thereof, issued on Oct. 20, 2016, p. 1-p. 7.

"First Office Action of Europe Counterpart Application", issued on Nov. 17, 2016, p. 1-p. 8.

* cited by examiner

US 9,641,022 B2

POWER SUPPLY APPARATUS, BATTERY APPARATUS, AND BATTERY SYSTEM

CROSS-REFERENCE TO RELATED APPLICATION

This application is a 371 application of an international PCT application serial no. PCT/JP2013/055892, filed on Mar. 4, 2013, which claims the priority benefit of Japan application no. 2012-047083, filed on Mar. 2, 2012. The entirety of each of the above-mentioned patent applications is hereby incorporated by reference herein and made a part of this specification.

TECHNICAL FIELD

The present invention relates to a power supply apparatus that receives electric power from a power source having a varying output and supplies electric power to the outside, as well as a battery apparatus and a battery system.

BACKGROUND ART

In view of environmental problems, development of power supply apparatuses that uses sunlight, wind power, wave power, tidal power, tidal energy, and other natural energy is being pursued in recent years. However, power generation methods that use natural energy have the drawback that the energy density is low. Another drawback is that the output of electric power generated in these methods is affected by weather conditions and is thereby varied, preventing electric power from being stably supplied at all times.

In Patent Literature 1, for example, to prevent an overcurrent in a wind power generator from flowing into a secondary battery, a wind power generation apparatus is proposed that detects the voltage of a smoothing capacitor in the wind power generator; the wind power generation apparatus interconnects the secondary battery and wind power generator when the voltage of the smoothing capacitor becomes substantially the same as the voltage of the secondary battery, and interconnects the wind power generator and secondary battery through a current-limiting circuit when there is a difference in these voltages.

In Patent Literature 2, a charging control apparatus is indicated in which a charging control unit identifies the battery cell having the lowest cell voltage from a plurality of battery cells connected in series in a battery according to detection results of cell voltages detected by a cell voltage detecting unit, after which the charging control unit individually turns on and off a plurality of switches, each of which is connected between each two of the plurality of battery cells and stores electric power obtained by photovoltaic batteries in the identified battery cell, enabling the remaining capacities in all battery cells to be efficiently equalized.

In Non-Patent Literature 1, a photovoltaic generation system is indicated in which a capacitor is connected in parallel to each of a plurality of photovoltaic battery modules; when any photovoltaic battery module is shadowed, it is temporarily disconnected from a photovoltaic battery module array by a metal-oxide-semiconductor field effect transistor (MOSFET), and after other capacitors have been adequately charged, the disconnected photovoltaic battery module is connected to the array again.

PRIOR ART DOCUMENTS

Patent Literatures

Patent Literature 1: Japanese Unexamined Patent Application Publication No. 2005-20805
Patent Literature 2: Japanese Unexamined Patent Application Publication No. 2009-142071

Non Patent Literature

Non Patent Literature 1: Simizu Toshihide, Yoshida Toshiya, Oniwa Katsumi, "A Photovoltaic Generation System with Improvement of Power Degradation Caused by Non-Uniform Insolation", The Transactions of the Institute of Electrical Engineers of Japan. D, vol. 126, pp. 92-93, 2006

SUMMARY OF THE INVENTION

Technical Problem

With the wind power generation apparatus described in Patent Literature 1, a secondary battery can be protected against an overcurrent that is generated when a wind velocity is high, because a current-limiting circuit structured with a current-limiting resistor and the like controls a current that flows into the secondary battery. And, a direct-current capacitor is provided at an upper stage of the current-limiting circuit to prevent voltage fluctuation. Thus, with the disclosed wind power generation apparatus, nothing is disclosed for effective collection of electric power during low-current power generation when the wind velocity is low. When electric power of the wind power generator is directly connected to the secondary battery, the voltage of the secondary battery is not reached due to the low wind velocity, making it impossible to obtain the electric power of the wind power generator.

In the case of photovoltaic power generation as well, when the energy of illuminating light is weak, the voltage of the secondary battery is not reached and the electric power of the photovoltaic generator cannot be obtained.

With the charging control apparatus described in Patent Literature 2, all battery cells in the battery are evenly charged by the charging control unit, but this type of charging control apparatus is structured simply so that battery cells are charged with electric power obtained by photovoltaic batteries through switches among the battery cells. In addition, like the lithium-ion battery cell, the battery cell has low responsiveness, lowering the charge and discharge efficiency.

In this case, if any of the photovoltaic battery modules causes a power generation drop, the power generation efficiency of the entire photovoltaic battery is lowered due to an effect of the photovoltaic battery module that has caused an output drop and a converter generates a large voltage conversion loss, so the battery cells cannot be efficiently charged.

With the photovoltaic generation system described in Non Patent Literature 1, a condenser is connected in parallel to each of a plurality of photovoltaic battery modules; when any of the photovoltaic battery modules is shadowed, it is temporarily disconnected from a photovoltaic battery module array, so condensers are charged without being affected by the photovoltaic battery module that has caused an output drop.

With this type of photovoltaic generation system, however, to prevent the effect by the photovoltaic battery module that has caused an output drop, it is necessary to provide a MOSFET between each two photovoltaic battery modules, the MOSFET being used to disconnect the shadowed photovoltaic battery module. Since the module that generates electric power reduced due to a shadow or the like is disconnected from the array in this way, if an array in which a plurality of photovoltaic battery modules are connected in series is formed, other photovoltaic battery modules cannot generate electric power at their maximum power points. Accordingly, due to the effect by the module that generates lowered electric power, electric power as the entire photovoltaic battery cannot be adequately obtained.

As described above, it has been impossible for conventionally proposed apparatuses that store electric power generated from natural energy to efficiently store electric power when the electric power is lowered.

An object of a power supply apparatus according an embodiment is to receive electric power from a power source having a varying output, efficiently store the electric power, and supply electric power to the outside.

Embodiments to solve the above mentioned problems are realized in the following item sets.

1. A power supply apparatus that receives electric power from a power generation apparatus having a varying output and supplies electric power to an outside, the power supply apparatus comprising:

a power storage device that has a larger amount by which electric power is stored and/or a lower self-discharge rate than a capacitor device used as a passive device and also has higher charge and discharge efficiency and/or higher responsiveness than a secondary battery, the power storage device receiving electric power from the power generation apparatus and discharging electric power to the outside;

a current control unit that controls a current supplied from the power storage device to the outside; and a control unit that controls a current and a voltage of the power generation apparatus by charging and discharging the power storage device, so as to maximize an amount of power generation by the power generation apparatus.

With the power supply apparatus, insulation is not provided between a power generation apparatus that performs photovoltaic power generation, wind power generation, or the like and power storage devices but the power generation apparatus and a power storage device constantly form a parallel circuit, so it is possible to receive electric power from the power generation apparatus, efficiently store the electric power, and supply electric power to the outside.

2. The power supply apparatus according to item 1, comprising:

a first current sensor that measures input and output currents of the power storage device;

a first voltage sensor that measures a voltage of the power storage device; and a second current sensor that measures a current of the power generation apparatus; wherein the control unit uses the first voltage sensor and the second current sensor to calculate electric power of the power generation apparatus and controls the current control unit so as to maximize electric power from the power generation apparatus.

The power supply apparatus uses a second current sensor to measure a current from the power generation apparatus, calculates electric power from a measurement result, provided by a first current sensor, of a current from the power storage device and a voltage measurement result provided by a first voltage sensor, and perform current control for a current control unit so as to maximize electric power obtained by photovoltaic power generation.

3. The power supply apparatus according to items 1 or 2, wherein the power storage device is a lithium-ion capacitor.

4. The power supply apparatus according to any one of items 1 to 3, wherein the power generation apparatus is a photovoltaic power generation apparatus or a wind power generation apparatus.

5. The power supply apparatus according to any one of items 1 to 4, wherein:

in a situation that electric power consumed by an external load is larger when compared with the power generation apparatus, the control unit causes the power storage device to performs discharging to the external load; and in a situation that electric power consumed by an external load is smaller when compared with the power generation apparatus, the control unit causes the power storage device to charge the external load.

6. The power supply apparatus according to any one of items 1 to 5, comprising:

a first to an n-th power storage devices, wherein n is a natural number larger than or equal to 2, wherein:

the first power storage device is connected in parallel to a first power generation apparatus, the n-th power storage device is connected in parallel to a n-th power generation apparatus, the first to n-th power storage devices are mutually connected in series, and the first to n-th power generation apparatuses are mutually connected in series through a diode.

In this structure, the power supply apparatus can enables first to n-th power storage devices to be charged with electric power at the maximum power points of corresponding first to n-th power generation apparatuses, without outputs at the maximum power points being affected.

For example, the first to n-th power generation apparatuses are now assumed to be photovoltaic batteries. Since they are mutually connected, if some of photovoltaic batteries are shadowed, the total output of all photovoltaic batteries is lowered. Since, however, the first to n-th power storage devices are connected in parallel to each photovoltaic battery and the photovoltaic batteries are mutually connected in series through diodes, the first to n-th power storage devices connected to some of non-shadowed photovoltaic batteries can be charged without being affected by any of the shadowed photovoltaic batteries. That is, since the shadowed photovoltaic batteries are disconnected from the non-shadowed photovoltaic batteries by the effect of the diodes, the non-shadowed photovoltaic batteries are not affected by the shadowed photovoltaic batteries.

7. The power supply apparatus according to item 6, wherein:

the current control unit is connected between a positive terminal of the first power storage device and a negative terminal of the n-th power storage device, the first power storage device and the n-th power storage device being connected in series, the current control unit converting a voltage between the positive terminal and the negative terminal to a prescribed voltage; and the control unit controls a conversion operation performed by the current control unit according to a change in the voltage between the positive terminal and the negative terminal.

With this structure, when the current control unit is driven, the total voltage of the first to n-th power storage devices can be made the same as an operation voltage on which the maximum voltages of the first to n-th power generation apparatuses can be output, and the use of the first to n-th power storage devices near the upper limit voltage to which they can be operated can be avoided, so the self-discharging losses of the first to n-th power storage devices are reduced and highly efficient charging becomes possible.

8. The power supply apparatus according to item 7, wherein:

a plurality of battery devices, which are connected in series, are connected to an output end of the current control unit;

the control unit controls the conversion operation performed by the current control unit according to a variation in the voltage between the positive terminal and the negative terminal; and electric power from the first to n-th power storage devices is stored in the plurality of battery devices according to the conversion operation performed by the current control unit.

The current control unit is driven by the control unit according to the variation of the total voltage of the first to n-th power storage devices and electric power from the first to n-th power storage devices is stored in a plurality of battery devices, so surplus electric power obtained after that the electric power has been stored in the first to n-th power storage devices can be transferred to the plurality of battery devices.

9. The power supply apparatus according to any one of items 6 to 8, wherein:

a first selector switch is connected between terminals of the first power storage device;

an n-th selector switch is connected between terminals of the n-th power storage device;

a first voltage converting unit is connected to the first to n-th selector switches, the first voltage converting unit converting a voltage on a bus to a prescribed voltage;

the control unit turns on and off each of the first to n-th selector switches according to a variation in an inter-terminal voltage of the each of the first to n-th power storage devices, and controls a conversion operation performed by the first voltage converting unit; and electric power converted by the first voltage converting unit is stored through the first to n-th selector switches, which have been turned on, in the corresponding first to n-th power storage devices.

Electric power converted by a first voltage converting unit is stored in any of the first to n-th storage devices through any of a first to n-th selector switches, so a voltage imbalance among the first to n-th storage devices, which are mutually connected in series, is complemented and a voltage drop between the first to n-th storage devices can be suppressed.

10. The power supply apparatus according to item 9, wherein:

a second voltage converting unit is connected between the positive terminal of the first power storage device and the negative terminal of the n-th power storage device, the second voltage converting unit converting the voltage between the positive terminal and the negative terminal to a prescribed voltage and converting the voltage on the bus to a prescribed voltage;

a third voltage converting unit is connected to both ends of the plurality of battery devices connected in series, the third voltage converting unit converting a voltage between the both ends to a prescribed voltage and converting the voltage on the bus to a prescribed voltage;

the control unit controls a conversion operation performed by the second voltage converting unit and/or the third voltage converting unit according a variation in the voltage on the bus; and charging and discharging are performed in the first to n-th power storage devices and/or the plurality of battery devices until the voltage on the bus is stabilized.

Since the control unit controls a converting operation performed by a second voltage converting unit and/or a third voltage converting unit and also controls charging and discharging between a bus and the first to n-th storage devices and/or charging and discharging between the bus and the plurality of battery devices, so the voltage of the bus, which varies depending on the operation state of a load, is stabilized.

11. A battery apparatus comprises: the power supply apparatus according to any one of items 1 to 10; and a battery device that stores electric power output by the power supply apparatus.

12. A battery system comprises: the power supply apparatus according to any one of items 1 to 10 or the battery apparatus according to item 11; and a photovoltaic power generation apparatus or a wind power generation apparatus connected to the power supply apparatus.

The power supply apparatus according to an embodiment can receive electric power from a power source having a varying output, can efficiently store the electric power, and can supply electric power to the outside.

DESCRIPTION OF EMBODIMENTS

Embodiments of a power supply apparatus according to the present invention will be described with reference to the drawings. The power supply apparatus according to these embodiments receives electric power from a power generation apparatus having a varying output and supplies electric power to the outside. Examples of power generation apparatuses having a varying output include photovoltaic power generation apparatuses, wind power generation apparatuses, hydraulic power generation apparatuses, wave activated power generation apparatuses, tidal power generation apparatuses, tidal energy power generation apparatuses, and vibration power generation apparatuses. The power supply apparatus in this present invention is also connected to a thermal power generation apparatus, a diesel power generation apparatus, and a fuel battery power generation apparatus, outputs of which are kept constant, but the method of connecting the power supply apparatus to these power generation apparatuses differs from the method of connecting the power supply apparatus to power generation apparatuses having a varying output.

A case in which a single power generation apparatus is used will be first described as [1] First embodiment, followed by a case in which a plurality of power generation apparatuses are used as [2] Second embodiment and by a case in which the power supply apparatus is applied to a vehicle as [3] Third embodiment.

[1] First Embodiment

A first embodiment is a case in which a single power generation apparatus is used.

[1.1] Power Supply Apparatus

Figure 1:
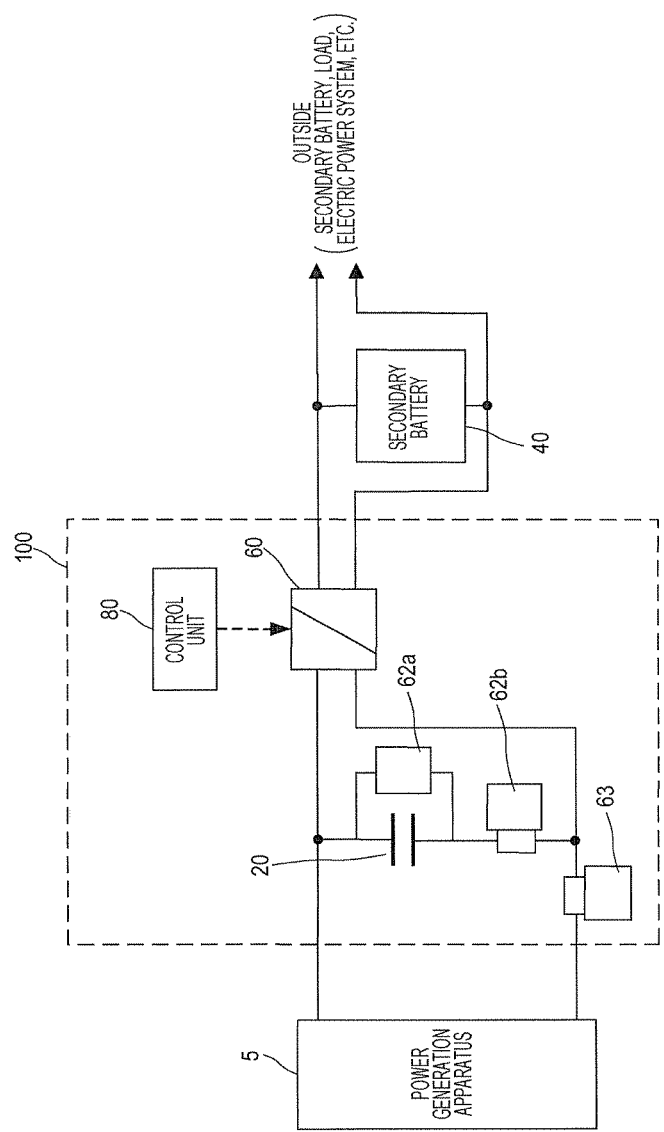
FIG. 1 illustrates an example of the structure of a power supply apparatus.

FIG. 1 illustrates an example of the structure of a power supply apparatus according to this embodiment. The power supply apparatus 100 illustrated in FIG. 1, which is an power supply apparatus that receives electric power from a power generation apparatus 5 having a varying output and supplies electric power to the outside, includes a power storage device 20 that has a larger amount by which electric power is stored and/or a lower self-discharge rate than a capacitor device used as a passive device and also has higher charge and discharge efficiency and/or higher responsiveness than a secondary battery. The power storage device 20 receives electric power from the power generation apparatus and discharges electric power to the outside. The power supply apparatus 100 also includes a current control unit 60 that controls a current supplied from the power storage device to the outside and a control unit 80 that controls the current and voltage of the power generation apparatus by charging and discharging the power storage device so as to maximize the amount of power generation by the power generation apparatus.

The power supply apparatus 100 further includes a voltage sensor 62a that measures the voltage of the power storage device 20, a current sensor 62b that measures the input and output currents of the power storage device 20, and a current sensor 63 that measure the current of the power generation apparatus.

The power generation apparatus, from which the power supply apparatus 100 receives electric power, is a wind power generator or a photovoltaic power generation apparatus, for example. The constituent elements of the power supply apparatus 100 will be described.

[1.1.1] Power Storage Devices

Figure 2A:
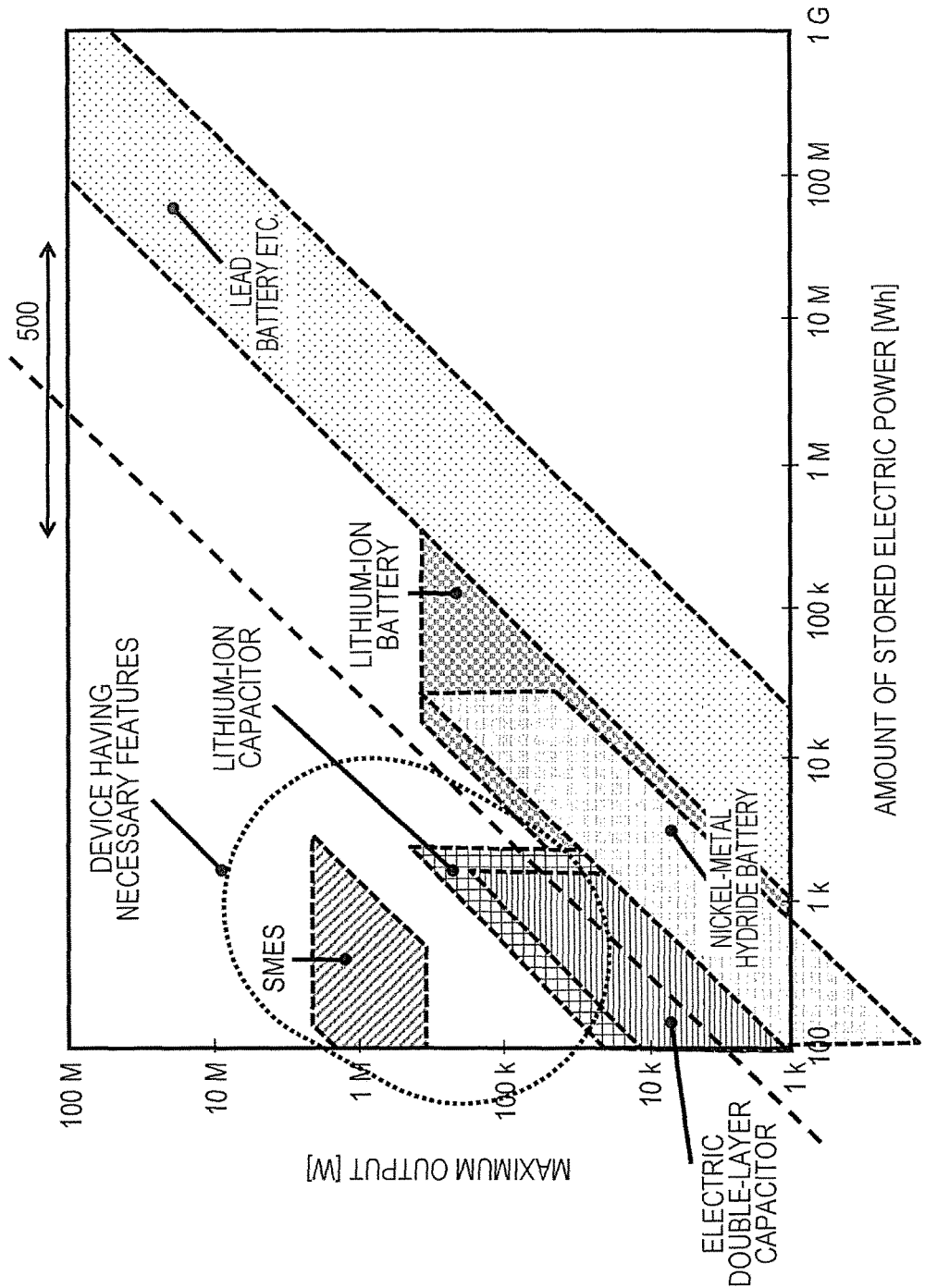
FIG. 2A illustrates various devices that store energy.

FIG. 2A illustrates various devices that store energy. FIG. 2A indicates a lithium-ion capacitor, a superconducting magnet energy storage (SMES), an electric double-layer capacitor, a nickel-metal hydride battery used as a secondary battery, a lithium-ion battery, a lead battery, and the like. Devices on the left side of the dashed line 500 are devices that have a small direct-current resistance and high charge and discharge efficiency, and the devices on the right side of the dashed line 500 are devices that have a large direct-current resistance and low charge and discharge efficiency.

As illustrated in the drawing, these devices are classified by the amount of stored electric power [Wh] and the maximum output [W]. These devices are also classified by their input/output responsiveness or charge and discharge efficiency.

A. Input/Output Responsiveness

As is well known, there is a positive correlation between the input/output responsiveness of the power storage device and the rated electric outputs of the power storage device. In other words, the larger the rated electric output of the power storage device is, the higher the input/output responsiveness of the power storage device is, and the smaller the rated electric output of the power storage device is, the lower the input/output responsiveness of the power storage device is.

B. Charge and Discharge Efficiency

As is well known, there is a negative correlation between the charge and discharge efficiency of the power storage device and the direct-current resistance of the power storage device. In other words, the smaller direct-current resistance of the power storage device is, the higher the charge and discharge efficiency of the power storage device is, and the larger direct-current resistance of the power storage device is, the lower the charge and discharge efficiency of the power storage device is. Capacitors used in an electric circuit as passive devices have an extremely small amount of electric power storage, so these capacitors cannot be illustrated.

Table 1 is a table that indicates the responsiveness, charge and discharge efficiency, and self-discharge rates of power storage devices. Power storage devices applied to this power supply apparatus are structured so that even if the output of one of a plurality of power sources having a varying output drops, other power sources operate at their maximum power points and that even if the power source output drops, electric power is maintained by stored electric power. If the electric power of the power source frequently changes, when charge and discharge efficiency is low, a loss occurs in the electric power generated by the power source. In view of this, the power storage device applied to this power supply apparatus has high charge and discharge efficiency.

TABLE 1

|  | Lithium-ion capacitor | SMES | Electric double-layer capacitor |
|---|---|---|---|
| Responsiveness = | Excellent | Excellent | Excellent |
| output density [W/kg] | 1,000 to 10,000 | 10,000 to 100,000 | 700 to 1,200 |
| Charge and discharge efficiency [%] = | 98 to 99 | 98 to 99 | 98 to 99 |
| DC resistance characteristics | Excellent (low resistance) | Excellent | Excellent |
| Self-discharge rate [%, month] | 3 to 5 | 0 to 1 | 50 to 75 |

|  | Lithium-ion battery | Nickel-metal hydride battery | Lead battery |
|---|---|---|---|
| Responsiveness = | Good | Good | Fair |
| output density [W/kg] | 250 to 1,000 | 250 to 1,000 | 150 to 250 |
| Charge and discharge efficiency [%] = | 80 to 90 | 60 to 70 | 50 to 90 |
| DC resistance characteristics | Good | Good | Fair (high resistance) |
| Self-discharge rate [%/month] | 5 to 15 | 25 to 35 | 3 to 20 |
|  | Aluminum Electrolytic Condenser | Ceramic condenser | Teflon condenser |
| Self-discharge rate | 63%/second | 45%/minute | 46%/week |

C. Amount of Stored Electric Power and Self-Discharge Rate

As with condenser (also referred to as capacitor devices) used in electric circuits as passive devices, if the amount of stored electric power is small and the self-discharge rate [%/month] is high, the voltage quickly drops due to a discharge, in which case other power storage devices cannot operate for a long period of time at their maximum power points. Accordingly, the power storage device applied to this power supply apparatus is required to have a low self-discharge rate enough to maintain voltage with stored electric power and essentially eliminate self-discharge.

As described above, the "lithium-ion capacitor" and "electric double-layer capacitor" have a larger amount of stored electric power and/or a lower self-discharge rate than capacitor devices used as passive devices and also have higher charge and discharge efficiency and/or higher responsiveness than the secondary battery.

Since the power storage device applied to this power supply apparatus is required to have high input/output responsiveness, high charge and discharge efficiency, the amount of stored electric power enough to maintain voltage with stored electric power, and a low self-discharge rate, the power storage device is equivalent to the "lithium-ion capacitor" and "SMES" illustrated in FIG. 2A.

[1.1.2] Current Control Unit

The current control unit 60 controls a current supplied from the power storage device to the outside. The current control unit 60 includes a switching element that performs opening and closing operations, a switching element used for current control, a step-up circuit, a step-down circuit, and a circuit control part. The switching element used for current control is formed, for example, with a MOSFET and the like, and the circuit control part performs pulse width modulation (PWM) control according to a control signal supplied from the control unit 80 to control the amount of output current. The step-up circuit increases the voltage of the power storage device 20 when the voltage is lower than the external voltage, and lowers the voltage of the power storage device 20 when the voltage is higher than an external voltage.

[1.1.3] Control Unit

The control unit 80 controls the current and voltage of the power generation apparatus by charging and discharging the power storage device so as to maximize the amount of electric power generation by the power generation apparatus. The control unit 80 includes a storage part in which data and programs are stored and also includes a processing part that performs numeric calculation processing. In the storage part, a control program that performs maximum power point tracking (MPPT) processing and power generation data used in a table lookup method, described later, are stored.

The control unit 80 implements MPPT processing so as to maximize electric power from the power generation apparatus by executing the control program and outputting control signals to the current control unit 60 and the like in response to electric signals that indicate currents and a voltage received from the sensors 62a, 62b, and 63.

The control unit 80 separately calculates the electric power of the power generation apparatus 5 and the electric power of the power storage device 20. During an output of 10 A (Ampere) in photovoltaic power generation, for example, if a decision is made that the MPPT efficiency will be raised by lowering a voltage under the condition that the current control unit 60 supplies 5 A to the outside and stores 5 A in the power storage device, the control unit 80 must lower the voltage of the power storage device by discharging the power storage device, so a current exceeding the charge current supplied to the power storage device 20 (current, used for discharging, that is equal to or higher than 5 A) must be transported to the outside by the current control unit 60. Accordingly, the current sensor 62b disposed on the same side as the power storage device and the current sensor 63 disposed on the same side as the power generation apparatus are needed as current sensors.

A. MPPT Processing

MPPT processing will be described. Electric power is obtained by the product of a current and a voltage, and the value of electric power that can be retrieved can be maximized by controlling the voltage and current with appropriate balance. Therefore, the control unit 80 performs MPPT control (maximum power point tracking control) so that the power generation apparatus can operate at its maximum power point.

The control unit 80 executes the "hill-climbing method" and/or "table lookup method" as MPPT control.

The hill-climbing control method is a method in which a voltage or current that is actually output from a power generation apparatus is detected, the current is varied little by little, and electric power before control and electric power after control are compared so that the operation point follows up to the maximum power point.

Figure 2B:
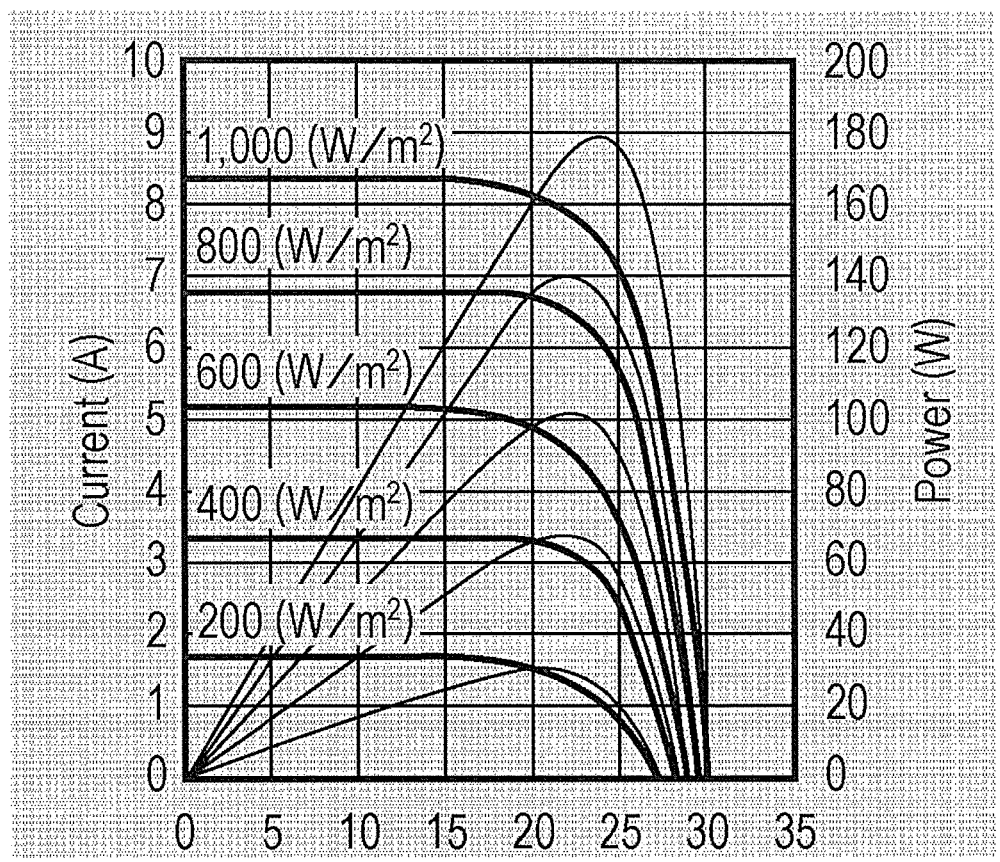
FIG. 2B illustrates a relationship between solar irradiance and power generation curves.

The hill-climbing method in photovoltaic power generation control will be described with reference to FIG. 2B. FIG. 2B illustrates a relationship between solar irradiance and power generation curves. In FIG. 2B, curves like hills are the curves of electric power; when the value of an output current is changed toward the top of the curve, the voltage point moves as if it were climbing a hill, so the method is named the "hill-climbing method". When the solar irradiance and temperature are first determined and the current is changed under the condition, the voltage is also determined. When, for example, the panel temperature is 25° C. and the solar irradiance is 600 W/m$^2$, if a current cannot flow (there is neither a load nor a secondary battery), the voltage becomes an open-circuit voltage of about 28V and the current becomes 0A. If a load is connected and a current of 4 A can be made to flow, the voltage becomes 26V or 17V. If the current is then raised to 5 A, the voltage becomes about 22V, reaching the maximum power point. Control can be performed by changing the current output from the photovoltaic battery to constantly search for the maximum power point in this way.

In wind power generation, an electric output in wind power generation is a mechanical load to a power generator in wind power generation. That is, if a design is made so that an infinite current can be derived (the output terminals of the wind power generator are short-circuited or the wind power generator is placed in state in which an ultra large current can be made to flow into a load), the rotational force required to rotate the power generator by wind is also infinitely increased. That is, the wind mill does not rotate and the electric output becomes 0 W. In short, even if there is a strong wind, the rotational speed becomes 0 (the output terminals are short-circuited) or becomes very high (the output terminals are opened), depending on the current (electric power) to be retrieved.

As in photovoltaic power generation, if the current retried from the wind power generator is raised or lowered little by little, the voltage generated by the wind power generator is lowered or raised accordingly. In this case, if the current and voltage are measured in advance and a current at which electric power is maximized is found, the hill-climbing method is achieved.

The table lookup method is a control method in which power generation data in various states in photovoltaic power generation and wind power generation is collected in advance, the data is compiled as a table, the table is input into an MPPT control unit, and the table is referenced. The table lookup method is advantageous in that if data has been precisely collected, MPPT control can be easily performed, but is disadvantageous in that the amount of data collected in advance becomes vast. In photovoltaic power generation, there are too many parameters such as different types of solar radiations at different radiation angles, temperature, solar irradiance, the number of connections in series, the number of connections in parallel, and the like to use the table lookup table with ease. In wind power generation, if there is data that represents a relationship between wind velocity and electric power, the maximum power point can be relatively precisely inferred, so the table lookup method is used sometimes.

In wind power generation, a wind meter is attached, and a table is referenced with respect to the wind velocity measured by the wind meter to determine a current that brings the maximum electric power. As a result, an electric output in wind power generation and a mechanical input due to a wind are balanced, outputting maximum electric power.

B. External Load Control

Load control in a case in which a secondary battery is connected to the outside of the power supply apparatus 100 will be described. If electric power generated in photovoltaic power generation or the like is larger than electric power consumed by a load, the current control unit 60 constantly supplies electric power to the load and charges the power storage device with surplus electric power or the current control unit 60 charges the external secondary battery. In this case, if the voltage of the power storage device is raised, a deviation from the maximum electric power point of the power generation apparatus occurs, lowering the MPPT efficiency. If the current control unit 60 is used to supply electric power to the outside, electric energy is lost by an amount equal to the efficiency of the current control unit 60 and the charge and discharge efficiency of the secondary battery. Furthermore, if the current control unit 60 is operated to transport a low current, its conversion efficiency itself is greatly lowered.

In view of this, the control unit 80 calculates a loss due to a reduction in MPPT efficiency (opportunity loss caused by the inability to generate electric power in spite of the presence of a wind and solar radiation) and a loss involved in charging the secondary battery (conversion efficiency and secondary battery charge and discharge efficiency in consideration of the fact that the conversion efficiency is changed by the transported current) and compares these losses to select a smaller loss.

Electric power consumed by a load may be larger than generated electric power in photovoltaic power generation or the like. In this case, if an output in wind power generation, photovoltaic power generation, or the like is available, the current control unit 60 constantly supplies electric power equal to the output in photovoltaic power generation or the like to the load. If the supplied electric power is insufficient, the current control unit 60 discharges the power storage device as an addition. The control unit 80 calculates a loss due to a reduction in MPPT efficiency caused by a voltage drop in the power storage device and a conversion loss in the current control unit 60 (unlike the above, the charge and discharge efficiency of the secondary battery is not included, and electric power that has been conveyed by the current control unit 60 is not stored in the secondary battery because the secondary battery is being discharged) and compares these losses to select a smaller loss.

[1.1.4] Battery

A battery 40 is, for example, a lithium-ion battery, a nickel-metal hydride battery, or a lead battery indicated in Table 1. The battery 40 stores electric power discharged from the power storage device. The battery 40 performs a charge operation and a discharge operation according to an external electric power demand.

Figure 3:
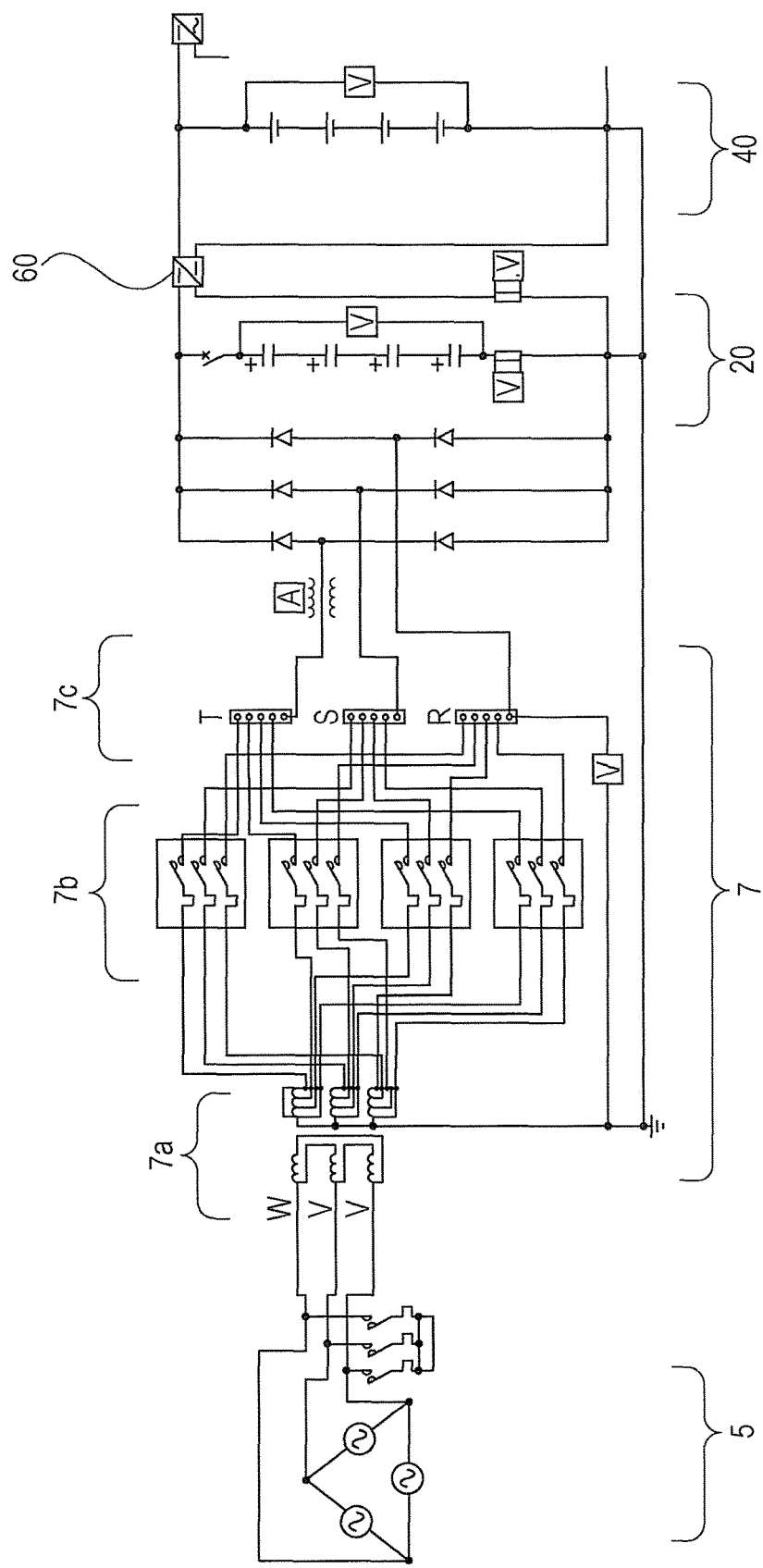
FIG. 3 is an electric circuit that illustrates a detailed example of a power supply apparatus applied to a wind power generator.

[1.2] Power Supply Apparatus that Receives Electric Power from a Wind Power Generator FIG. 3 illustrates an example of the structure of a power supply apparatus that receives electric power from a wind power generator. Since the wind power generator is an alternating-current power source, the power supply apparatus 100 illustrated in FIG. 3 is connected to a power generation apparatus 10, which is an alternating-current power source, through a transformer and rectifier 7. The transformer and rectifier 7 illustrated in FIG. 3 includes a four-tap switchover transformer 7a, a tap switchover electromagnetic switch 7b, and a rectifier 7c. The four-tap switchover transformer 7a performs a voltage conversion so that the output voltage of the power generation apparatus 10 falls in a range between the upper limit and lower limit of the power storage device 20. The tap switchover electromagnetic switch 7b selects a voltage to be applied to the power storage device 20 according to the output voltage of the power generation apparatus 10. The rectifier 7c converts alternating-current electric power from the power generation apparatus 10, which supplies an alternating-current output, into direct-current electric power.

As illustrated in FIG. 3, the power storage device 20 may be connected in series in correspondence to the voltage of the wind power generator.

Figure 4:
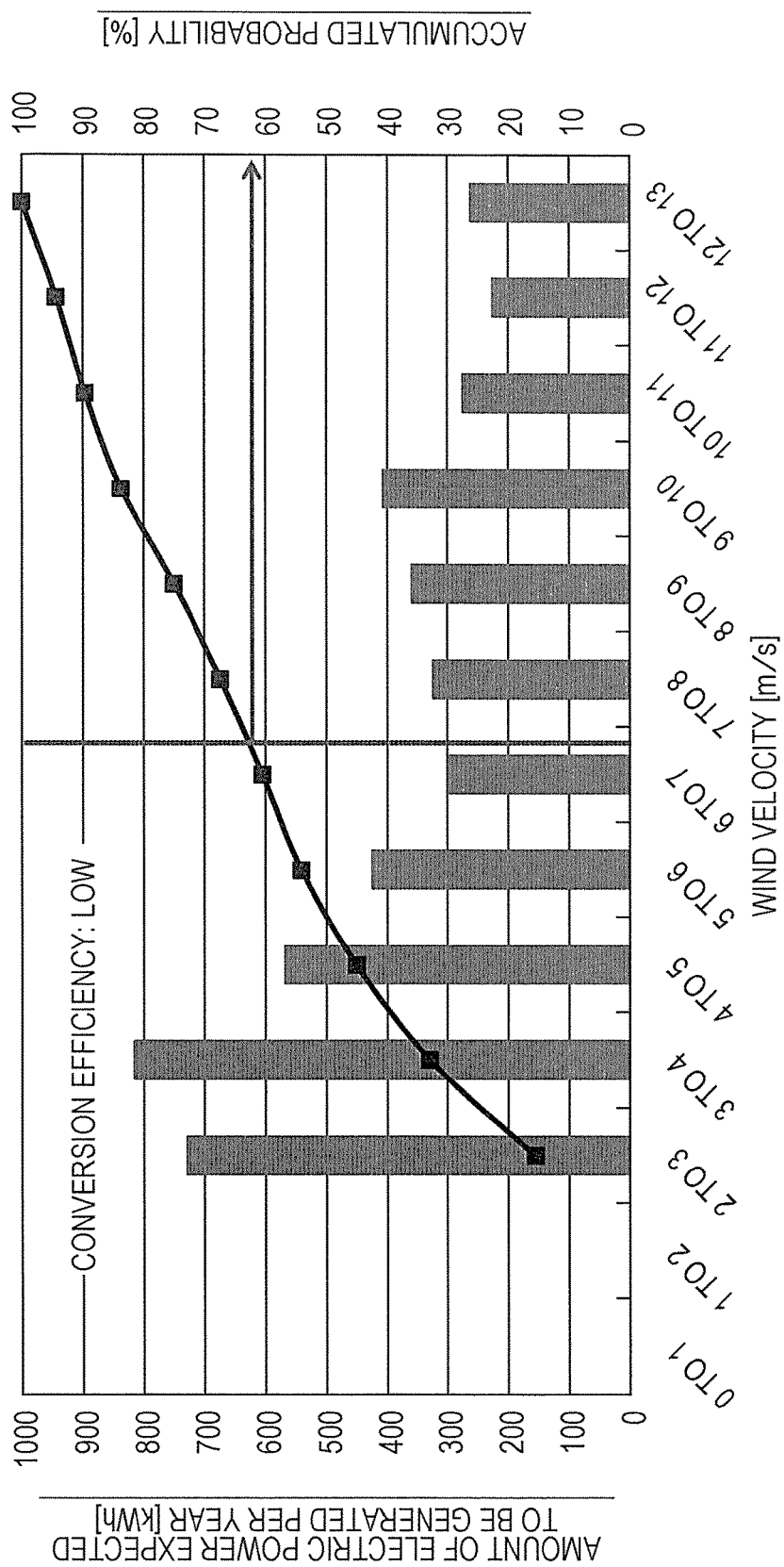
FIG. 4 illustrates a relationship between wind power generation and wind velocities.

FIG. 4 illustrates a relationship between wind power generation and wind velocities. On the land, many winds blow at velocities of 2 m/s to 4 m/s. Although many wind power generators that can generate electric power from these low-velocity winds have been developed in recent years, the electric conversion efficiency of a power converter connected to the wind power generator is greatly reduced, resulting in the inability to use electric power generated by the wind power generator. For this reason, it has been impossible to use electric power generated from winds, at velocities of 0 m/s to 4 m/s, which frequently occur and contribute to power generation that occupies a large portion of the amount of electric power generated throughout the year.

Figure 5:
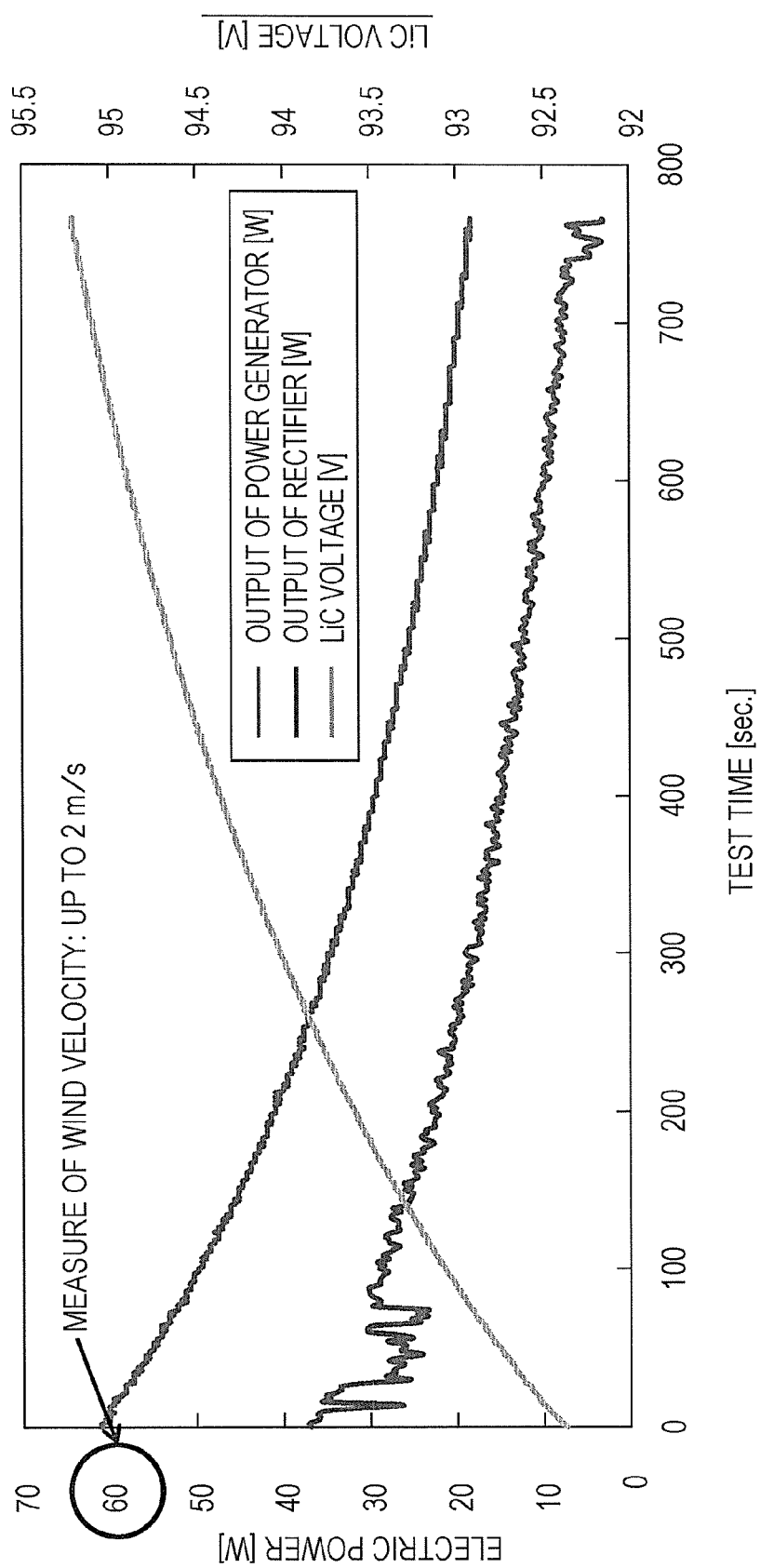
FIG. 5 illustrates an example of electric power generated in wind power generation and the power receiving capacity of a power supply apparatus.

FIG. 5 illustrates an example of electric power generated in wind power generation and the electric power receiving capacity of a power supply apparatus. A lithium-ion capacitor is used as the power storage device. As illustrated in FIG. 4, since the power supply apparatus 100 can store electric power even when the wind velocity is low, the power supply apparatus 100 can also store electric power generated from winds at velocities of 0 m/s to 4 m/s, which can be expected to contribute to power generation that occupies a large portion of the total amount of electric power generated a year indicated in FIG. 4.

[2] Second Embodiment

A second embodiment is a case in which a plurality of power generation apparatuses is used.

[2.1] Power Supply Apparatus

Now, a case in which the power supply apparatus in the present invention has been applied to, for example, a smart grid, which is a next-generation electric power network, will be described.

Figure 6:
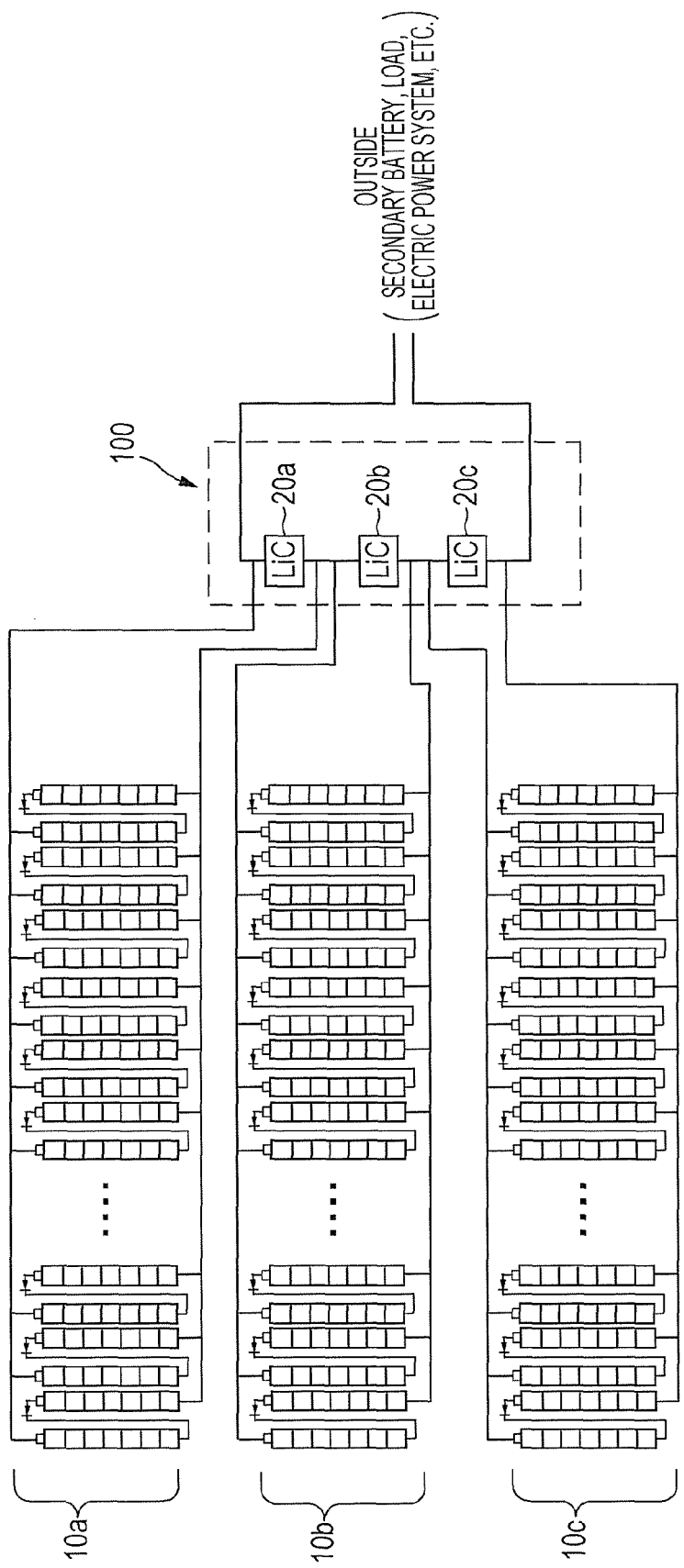
FIG. 6 illustrates an example of the structure of a power supply apparatus connected to a photovoltaic power generation apparatus.

FIG. 6 illustrates an example of the structure of the power supply apparatus. Photovoltaic (PV) arrays 10a to 10c, which are used as power generation apparatuses, are each formed with a 14 photovoltaic battery modules connected in series by 175 photovoltaic battery modules connected in parallel. Each of the PVs 10a to 10c forms an array in which 14 photovoltaic battery modules are connected in series. Each photovoltaic battery module is formed with a plurality of cells.

Figure 7:
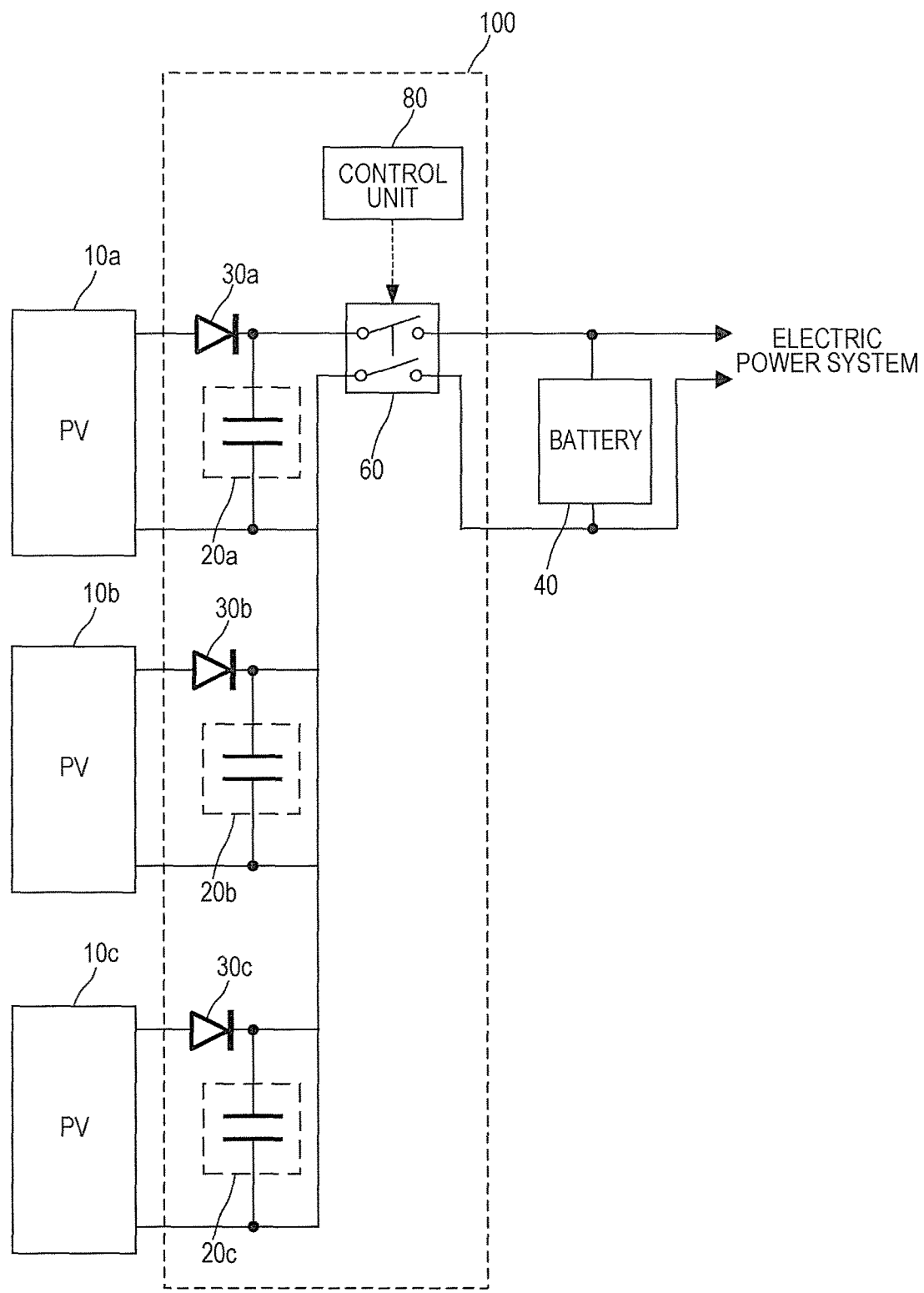
FIG. 7 illustrates an example of the structure of a power supply apparatus to be connected to a plurality of power generation apparatuses.

FIG. 7 illustrates an example of the structure of a power supply apparatus to be connected to a plurality of power generation apparatuses. In the power supply apparatus 100 illustrated in FIG. 7, a power storage device is provided for each PV and one of diodes 30a to 30c is provided therebetween.

Since the PVs 10a, 10b, and 10c are connected in series as illustrated in FIG. 7, if any one of these PVs is shadowed, not only the output of the shadowed PV but also the outputs of other PVs are reduced because the shadowed PV functions as a resistor. As a result, the total output of all PVs is reduced. Since, however, power storage devices 20a, 20b, and 20c are respectively connected in parallel to the PVs 10a, 10b, and 10c and the PVs 10a, 10b, and 10c are connected in series through diodes 30, the power storage device 20a, 20b, or 20c connected to the non-shadowed PV 10a, 10b, or 10c can be charged without being affected by the shadowed PV 10a, 10b, or 10c.

Specifically, when the voltage of the shadowed PV 10a, 10b, or 10c becomes lower than the voltage of the power storage device 20a, 20b, or 20c, the PV 10a, 10b, or 10c is disconnected from the power storage device 20a, 20b, or 20c due to the effect of the diode 30 connected to the positive terminal of the PV 10a, 10b, or 10c, preventing the non-shadowed PV 10a, 10b, or 10c from being affected by the shadowed PV 10a, 10b, or 10c. If the PV 10c, for example, is shadowed and the voltage at its positive terminal becomes lower than the voltage at the positive terminal of the power storage device 20b, the diode 30 reverse-biased and works so as to lose its continuity.

[2.2] Circuit Diagram of the Power Supply Apparatus

FIGS. 8A to 8F are circuit diagrams used to describe a power supply apparatus connected to a photovoltaic power generation apparatus. In this embodiment, a lithium-ion capacitor (LiC) is used as the power storage device and a lithium-ion battery (LiB) is used as the battery.

The power supply apparatus 100 illustrated in FIGS. 8A to 8F further includes selector switches 50a to 50d, a converter 60a used as the current control unit, converters 60b to 60d used for charging and discharging to and from the outside of the power supply apparatus 100, protective circuits 70a and 70b, and a control unit 80.

The same reference characters 90a indicate a detection line, the same reference characters 90b indicate a control line, and the same reference numeral 200 indicates a bus (DC bus) on a smart grid with a bus voltage of, for example, DC 380V. Although the bus 200 on a smart grid is used here as an example, this is not a limitation; the bus 200 can be used regardless of whether a current is a direct current or an alternating current without a limitation on the bus voltage. Reference characters "a" to "w" and "x-1" to "x-6" indicate connection points at which the control unit 80 detects a voltage or the like. Although, besides these connection points "a" to "w" and "x-1" to "x-6", there are a plurality of other connection points used by the control unit 80 for detection, only main connection points are indicated here.

As the PVs 10a to 10d, PVs made of mono-crystal silicon, poly-crystal silicon, amorphous silicon, thin-film silicon, and other various types of materials can be used. The PVs 10a to 10d are assumed to have the same or substantially the same related output. Since the PVs 10a to 10d have the same or substantially the same related output, if the PVs 10a to 10d are connected in series and are under the same solar irradiation condition, it becomes possible to suppress the total output of the PVs 10a to 10d from being lowered.

Another point to note is that although the maximum power point (MPP) of each of the PVs 10a to 10d is obtained from the electric power characteristics of operation voltage and operation current, the maximum power point largely depends on various battery devices and loads connected to each of the PVs 10a to 10d. Since the LiCs 20a to 20d described later are connected in parallel to the PVs 10a to 10d and the converter 60a described later is driven under maximum power point tracking control, this embodiment has various features; for example, charging is carried out at the maximum power points of the PVs 10a to 10d. These features will be described later.

The LiCs 20a to 20d stores electric power supplied from the PVs 10a to 10d. Alternatively, in order to stabilize the bus 200, the LiCs 20a to 20d supply or receive electric power to and from the bus 200 or perform another auxiliary role. These LiCs 20a to 20d are advantageous in that they have higher charge and discharge responsiveness, higher charge and discharge efficiency, and less self-discharge than ordinary electrolytic capacitors and batteries.

To store surplus electric power obtained after the charging of the LiCs 20a to 20d or to stabilize the bus 200, LiBs 40a to 40d supply or receive electric power to and from the bus 200 or perform another auxiliary role. Although the LiBs 40a to 40d are inferior in charge and discharge responsiveness, charge and discharge efficiency, and self-discharge characteristics to the LiCs 20a to 20d, the LiBs 40a to 40d are advantageous in that they have a charge capacity to some extent and are inexpensive. In this case, since other batteries such as lead batteries and nickel-metal hydride batteries also have a charge capacity to some extent and are inexpensive, these batteries can be used instead of the LiBs 40a to 40d.

The selector switches 50a to 50d are provided in correspondence to LiCs 20a to 20d. When electric power converted by the converter 60b and supplied from the bus 200 is stored in any one of the LiCs 20a to 20d, these selector switches 50a to 50d are turned on as indicated by the dotted lines.

The converter 60a, which performs DC-DC conversion, operates when maximum power point tracking (MPPT) is performed for the LiCs 20a to 20d as described later or surplus electric power after the charging of the LiCs 20a to 20d is stored in the LiBs 40a to 40d; the converter 60a converts direct-current voltages from the LiCs 20a to 20d to a prescribed direct-current voltage. To reduce the charging loss in the LiBs 40a to 40d, the prescribed direct-current voltage is preferably the same as the rated voltage of the LiBs 40a to 40d or a little higher voltage.

The converter 60b also performs DC-DC conversion in the same way described above; it converts the direct-current voltage (for example, DC 380V) on the bus 200 to a prescribed direct-current voltage. The prescribed direct-current voltage is, for example, lower than or equal to the dielectric strength of the PVs 10a to 10d, in consideration that the PVs 10a to 10d are disposed between the selector switches 50a to 50d and the LiCs 20a to 20d. Specifically, the prescribed direct-current voltage may be determined with, for example, the open-circuit voltage of the PVs 10a to 10d taken into consideration.

The converter 60c also performs DC-DC conversion in the same way described above; and the converter 60c operates when a demand adjustment is performed for the bus 200 (voltage variations are balanced). That is, although the voltage (for example, DC 380V, which is the stipulated voltage) on the bus 200 varies depending on the operation state of a load (not illustrated), the voltage on the bus 200 is preferably stabilized to transmit a stable voltage to the load. Accordingly, if the voltage on the bus 200 drops below the stipulated voltage due to, for example, an increase in load electric power, the direct-current voltage from the LiCs 20a to 20d is converted to a prescribed direct-current voltage by the converter 60c and electric power is supplied to the bus 200. It suffices for the prescribed direct-current voltage described here to take a value by which variations of the voltage on the bus 200 are kept within stipulated voltages.

If the voltage on the bus 200 is higher than, for example, DC 380V, the direct-current voltage on the bus 200 is converted to a prescribed direct-current voltage by the converter 60c and electric power from the bus 200 is stored in the LiCs 20a to 20d. It suffices for the prescribed direct-current voltage described here to be, for example, about the rated input voltage of the LiCs 20a to 20d.

As with the converter 60c, the converter 60d operates when a demand adjustment is performed for the bus 200 (voltage variations are balanced). That is, when the voltage on the bus 200 is lower than a stipulated voltage, the converter 60d converts a direct-current voltage from, for example, the LiBs 40a to 40d to a prescribed direct-current voltage and supplies electric power to the bus 200. It suffices for the prescribed direct-current voltage described here to take a value, as described above, by which variations of the voltage on the bus 200 are kept within stipulated voltages.

If the voltage on the bus 200 is higher than, for example, DC 380V, the direct-current voltage on the bus 200 is converted to a prescribed direct-current voltage by the converter 60d and electric power from the bus 200 is stored in the LiBs 40a to 40d. It suffices for the prescribed direct-current voltage described here to be, for example, about the rated input voltage of the LiBs 40a to 40d.

The protective circuit 70a prevents the converters 60a and 60c from being destroyed due to, for example, inrush currents from the LiCs 20a to 20d. The protective circuit 70b prevents the converters 60a and 60d from being destroyed due to, for example, inrush currents from the LiBs 40a to 40d. These protective circuits 70a and 70b internally include a current reducing element (such as a resistor or a reactor) and a switch, which are connected in parallel. When the converters 60a, 60c, and 60d are activated, the protective circuits 70a and 70b keep the switch connected in parallel to the current reducing element turned off until discharging due to the inrush currents from the LiCs 20a to 20d and the LiBs 40a to 40d is terminated. After a prescribed time has passed, the protective circuits 70a and 70b turn on the switch. The protective circuits 70a and 70b are turned on and off manually or under control of the control unit 80.

The control unit 80 detects the output voltages of the PVs 10a to 10d, the output voltages of the converters 60a to 60d, at the inter-terminal voltages of the LiCs 20a to 20d, the inter-terminal voltages of the LiBs 40a to 40d, the voltage and current on the bus 200, and the like through the detection line 90a connected to the plurality of connection points "a" to "w" and "x-1" to "x-6" described above. According to detection results of them, the control unit 80 drives the converters 60a to 60d and turns on and off the selector switches 50a to 50d. Although the detection line 90a is connected to all connection points "a" to "w" and "x-1" to "x-6", for convenience of illustration, a case in which the detection line 90a is connected to some of connection points "a" to "w" and "x-1" to "x-6" is illustrated.

Although the power supply apparatus 100 in this embodiment is assumed to have been connected to the bus 200 through which direct-current electric power passes, the power supply apparatus 100 may be of course connected to the bus 200 through which alternating-current electric power passes. In this case, it suffices to replace the converters 60c to 60d described above with inverters that perform DC-AC conversion and to replace the converter 60b with a converter that performs AC-DC conversion. Although charging and discharging in the LiCs 20a to 20d and LiBs 40a to 40d are controlled by the control unit 80, the setting of its control can be appropriately changed according to the operation state.

Figure 8A:
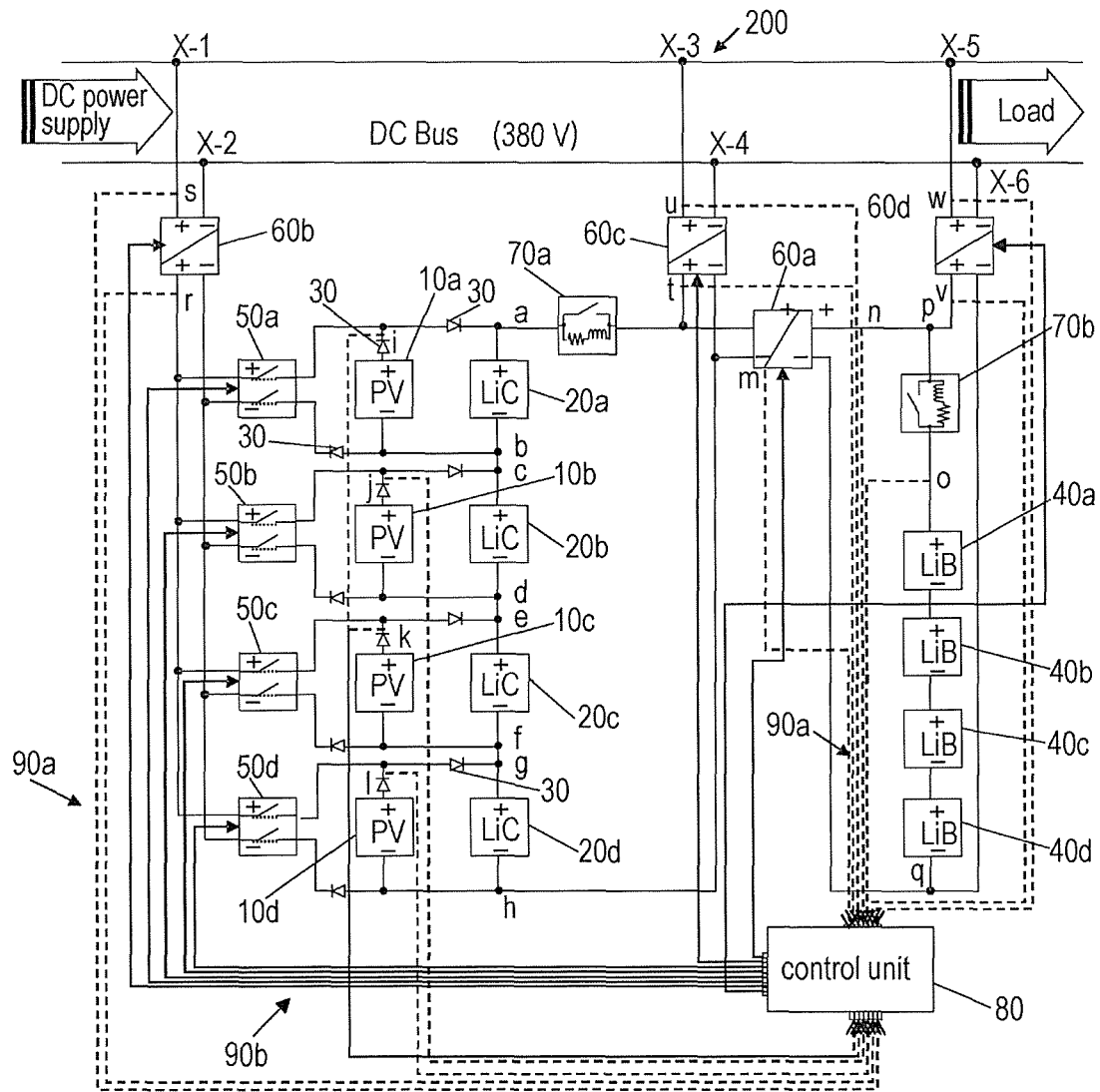
FIG. 8A is a circuit diagram of a power supply apparatus connected to a photovoltaic power generation apparatus.
Figure 8B:
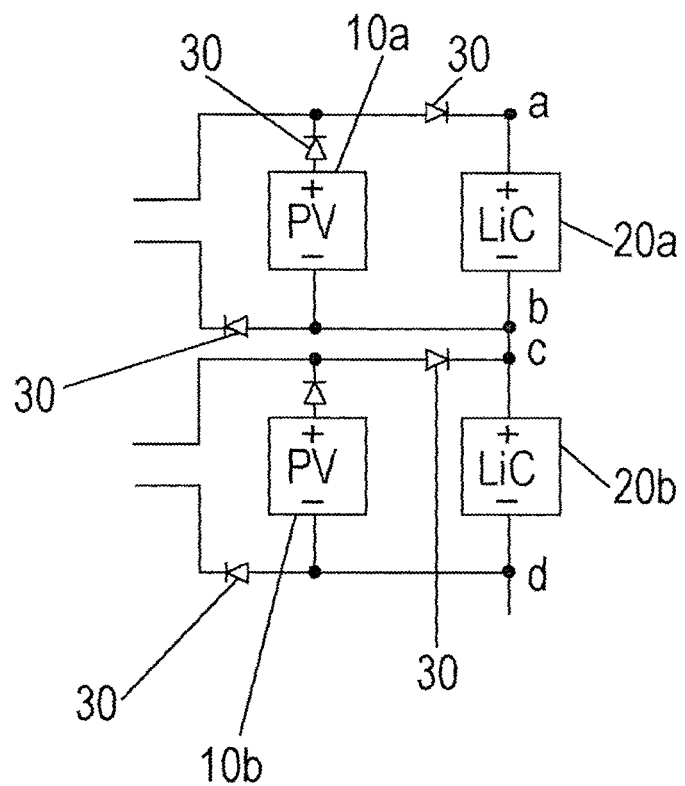
FIG. 8B is a circuit diagram of a power supply apparatus connected to a photovoltaic power generation apparatus.

In FIG. 8B, the PV 10a and LiC 20a are connected in parallel, the PV 10b and LiC 20b are connected in parallel, and the PV 10a and PV 10b are connected in series. The PVs 10c and 10d and LiCs 20c and 20d have a similar connection relationship with the PVs 10a and 10b and LiCs 20a and 20b, so the PVs 10a and 10b and LiCs 20a and 20b are illustrated as representatives in the drawing.

In the drawing, the positive terminal of the PV 10a is connected to the positive terminal of the LiC 20a through two diodes 30, which are connected in series in the forward direction from the positive terminal of the PV 10a, and the connection point "a", and the negative terminal of the PV 10a is connected to the negative terminal of the LiC 20a through the connection point "b". A leader line is drawn from a connection part between the two diodes 30, which are connected to the PV 10a and connection point "a", the leader line being connected to the positive terminal of the selector switch 50a. A leader line is drawn from a connection part between the negative terminal of the PV 10a and the negative terminal of the LiC 20a through the diode 30, the leader line being connected to the negative terminal of the selector switch 50a.

The positive terminal of the PV 10b is connected to the positive terminal of the LiC 20b through two diodes 30, which are connected in series in the forward direction from the positive terminal of the PV 10b, and the connection point "c", and the negative terminal of the PV 10b is connected to the negative terminal of the LiC 20b through the connection point "d". A leader line is drawn from a connection part between the two diodes 30, which are connected to the PV 10b and to connection point "c", the leader line being connected to the positive terminal of the selector switch 50b. A leader line is drawn from a connection part between the negative terminal of the PV 10b and the negative terminal of the LiC 20b through the diode 30, the leader line being connected to the negative terminal of the selector switch 50b.

The negative terminal of the PV 10a and the positive terminal of the PV 10b are connected through connection points "b" and "c" and through two diodes 30, which are connected in series in the forward direction from the positive terminal of the PV 10b toward connection point "c". These connection points "a" to "d" are also used as positions at which the control unit 80 detects the inter-terminal voltages of the LiCs 20a and 20b.

Referring again to FIG. 6, the effect provided by the power supply apparatus illustrated in FIG. 8A will be described. Even if electric power is lowered because, for example, the PV 10a in FIG. 6 is shadowed by a could, the LiC 20a maintains the voltage by using stored electric power and has a low self-discharge rate at which self-discharging does not essentially occur, enabling the PVs 10b and 10c to function at their maximum power points.

Referring again to FIG. 8B, since, in this structure, the LiCs 20a and 20b have high charge and discharge responsiveness and high charge and discharge efficiency as described above, if the converter 60a performs maximum power point tracking control to control the LiCs 20a and 20b so that the maxim power point is reached, output at the maximum power points of the PVs 10a and 10b is not affected. Accordingly, the LiCs 20a and 20b can be charged with electric power at the maximum power points of the PVs 10a and 10b.

In other words, even in a situation in which the PVs 10a and 10b can output the maximum electric power, if the capacity (responsiveness and charge and discharge efficiency characteristics) of the power receiving side is low, outputs from the PVs 10a and 10b is reduced to match the capacity (responsiveness and charge and discharge efficiency characteristics) of the power receiving side. Accordingly, if the LiCs 20a and 20b having high charge and discharge responsiveness are used, as in this embodiment, electric power from the PVs 10a and 10b can be stored without impeding the situation in which the PVs 10a and 10b can output the maximum electric power.

In addition, since the LiCs 20a and 20b have high charge and discharge responsiveness and high charge and discharge efficiency, it becomes unnecessary to interpose a converter or another component, between the PVs 10a and 10b, that has been conventionally used to adjust voltage or the like to store electric power at the maximum power point. Since the LiCs 20a and 20b are connected in series, a high voltage can also be output from the connection point "a" by a discharge.

Figure 8C:
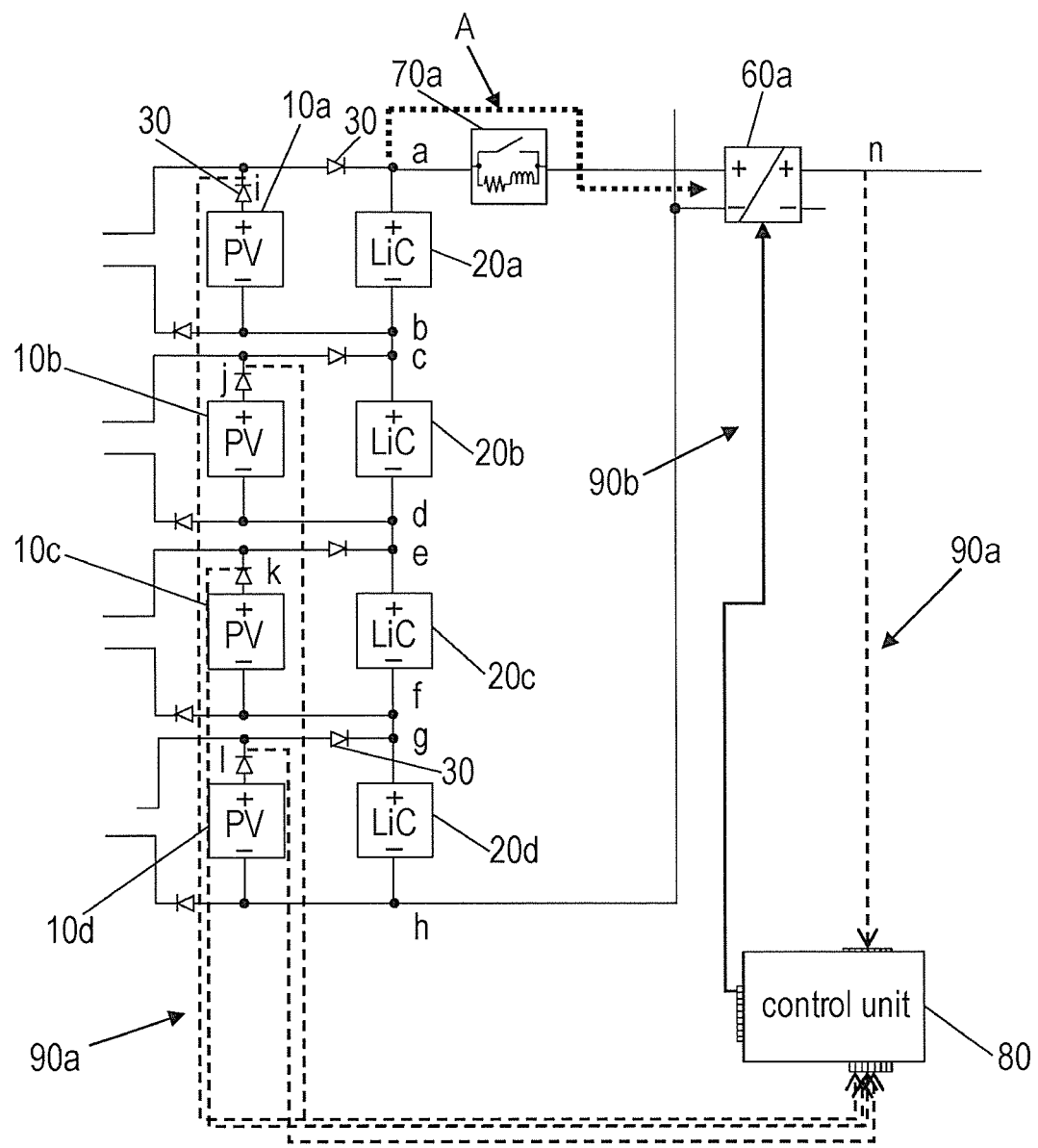
FIG. 8C is a circuit diagram of a power supply apparatus connected to a photovoltaic power generation apparatus.

In FIG. 8C, the converter 60a controlled by the control unit 80 is connected to the connection point "a" of the LiC 20a through the protective circuit 70a.

That is, the LiCs 20a to 20d are connected in parallel to the PVs 10a to 10d as illustrated in the drawing and are also mutually connected in series. The converter 60a is connected between the connection point "a" of the LiC 20a and the connection point "h" of the LiC 20d. The protective circuit 70a is disposed between the positive terminal of the LiC 20a and the positive terminal of the converter 60a. The control unit 80 detects voltages at connection points "i" to "l", that is, the output voltages of the PVs 10a to 10d, through the detection line 90a. The control unit 80 also detects the inter-terminal voltages of the LiCs 20a to 20d through connection points "a" to "h".

In this structure, the control unit 80 can detect voltages at connection points "i" to "l", that is, operation voltages of the PVs 10a to 10d. The control unit 80 can also detect a voltage between connection points "a" to "h", that is, the total voltage of the LiCs 20a to 20d connected in series. When detecting a change in the voltage, the control unit 80 drives the converter 60a through the control line 90b.

That is, since the LiCs 20a and 20b have high charge and discharge responsiveness and high charge and discharge efficiency, electric power can be stored at the maximum power points of the PVs 10a to 10d, as described above. When the converter 60a is driven, the voltages of the LiCs 20a to 20d can be made to match operation voltages at which the PVs 10a to 10d can output the maximum electric power. Thus, charge losses in the PVs 10a to 10d and LiCs 20a to 20d are reduced, enabling highly efficient charging.

As a result of driving the converter 60a, a current flows through a short-circuited switch in the protective circuit 70a as indicated by the dotted lines indicated by the arrow A. Since, however, the amount of current is controlled, so-called maximum power point tracking (MPPT) control can be performed, in which the voltages of the LiCs 20a to 20d can be made to match operation voltages at which the PVs 10a to 10d can output the maximum electric power.

Figure 8D:
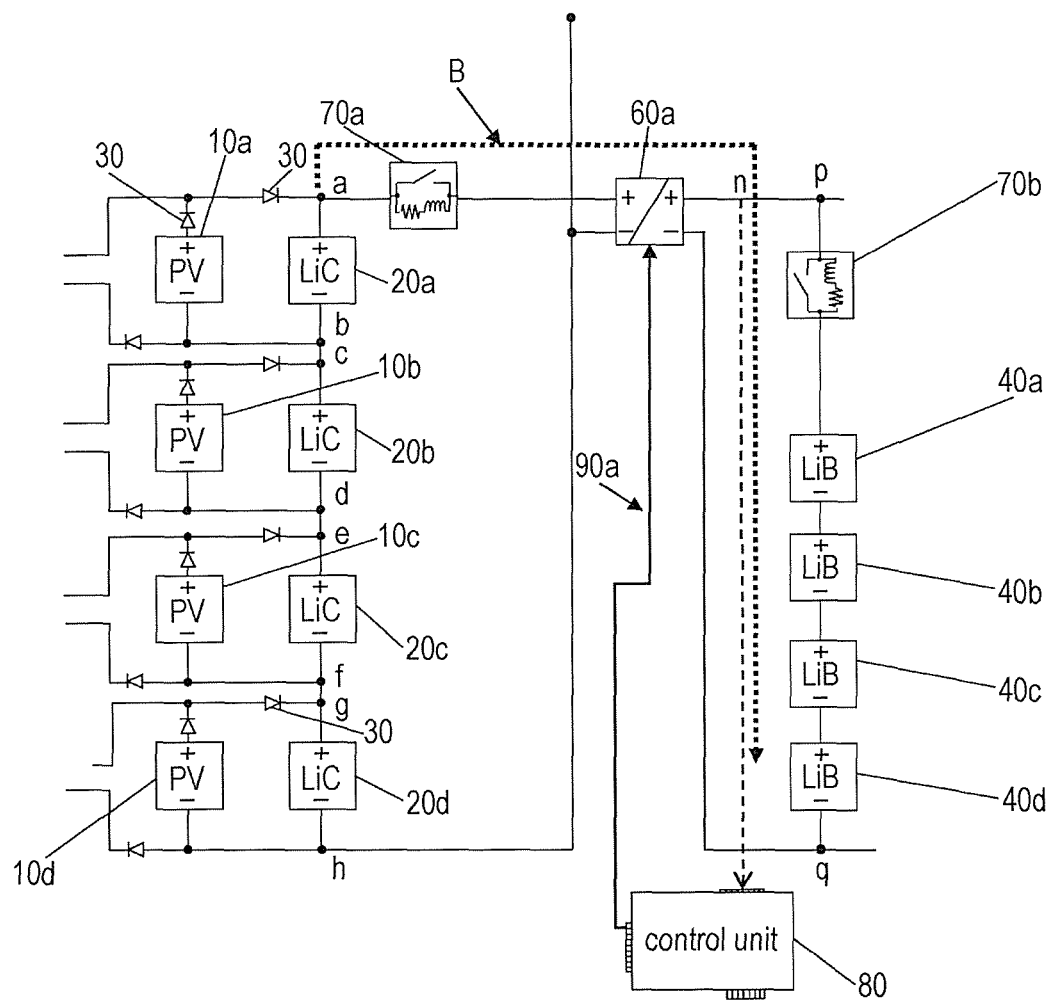
FIG. 8D is a circuit diagram of a power supply apparatus connected to a photovoltaic power generation apparatus.

An advantage in FIG. 8D is that surplus electric power obtained after the control unit 80 has driven the converter 60a and has stored electric power in the LiCs 20a to 20d is transferred to the LiBs 40a to 40d. Since the LiCs 20a to 20d are connected in series, the electric potential at connection point "a" can be raised. In addition, even if part of the PVs 10a to 10d causes a voltage drop by, for example, being shadowed, the LiCs 20a to 20d undergo auxiliary charging by switching electric power from the converter 60b with the selector switches 50a to 50d. Accordingly, the converter 60a can be constantly driven near the rated input voltage.

That is, the converter 60*a* is connected to connection point "a" of the LiC 20*a* through the protective circuit 70*a* as described above. Furthermore, the LiBs 40*a* to 40*d* are connected to the output side of the converter 60*a* through the protective circuit 70*b*. The LiBs 40*a* to 40*d* are mutually connected in series.

In this structure, the control unit 80 detects the inter-terminal voltage of each of the LiCs 20*a* to 20*d* and detects the total voltage of the LiCs 20*a* to 20*d* through connection points "a" to "h". If the control unit 80 detects that the total voltage of the LiCs 20*a* to 20*d* has exceeded a prescribed voltage, it can be recognized that any one of the LiCs 20*a* to 20*d* has been fully charged.

In this case, the control unit 80 drives the converter 60*a* through the control line 90*b* to have the LiCs 20*a* to 20*d*, which are connected in series, output (discharge) electric power. The electric power is stored in the LiBs 40*a* to 40*d* through the short-circuited switch in the protective circuit 70*b* as indicated by the dotted lines indicated the arrow B.

If the control unit 80 detects that one of the LiCs 20*a* to 20*d* had caused an inter-terminal voltage drop and the inter-terminal voltage has fallen below a prescribed value, the control unit 80 stops the driving of the converter 60*a* through the control line 90*b*.

Thus, since surplus electric power in the LiCs 20*a* to 20*d* is transferred to the LiBs 40*a* to 40*d*, it can be stored in the LiBs 40*a* to 40*d*.

In addition, since it is avoided that any of the LiCs 20*a* to 20*d* is not fully charged, the situation in which the PVs 10*a* and 10*b* can output the maximum electric power is not impeded as described above.

Since the LiCs 20*a* to 20*d* are connected in series, the electric potential output from connection point "a" can be raised and the converter 60*a* can be thereby driven around its rated input voltage, so a voltage conversion loss in the converter 60*a* can be reduced as much as possible at a time when the converter 60*a* is driven. In other words, since the electric power from the LiCs 20*a* to 20*d* can be stored in the LiBs 40*a* to 40*d* in a state in which the loss in the converter 60*a* is reduced, the LiBs 40*a* to 40*d* can be efficiently charged. Furthermore, since the LiCs 20*a* to 20*d* are mutually connected in series, the electric power output from the LiCs 20*a* to 20*d* can be raised to an electric potential equal to the electric potential of the LiBs 40*a* to 40*d* without having to interpose a converter that adjusts voltage and the like, and the input voltage and output voltage of the converter 60*a* can be thereby made at the same electric potential. As a result, the efficiency of the voltage conversion by the converter 60*a* itself can be increased.

Even if part of the PVs 10*a* to 10*d* causes a voltage drop due to a shadow or another reason, the LiCs 20*a* to 20*d* are recharged by switching electric power from the converter 60*b* with the selector switches 50*a* to 50*d*, so the converter 60*a* can be constantly driven around its rated input voltage.

Figure 8E:
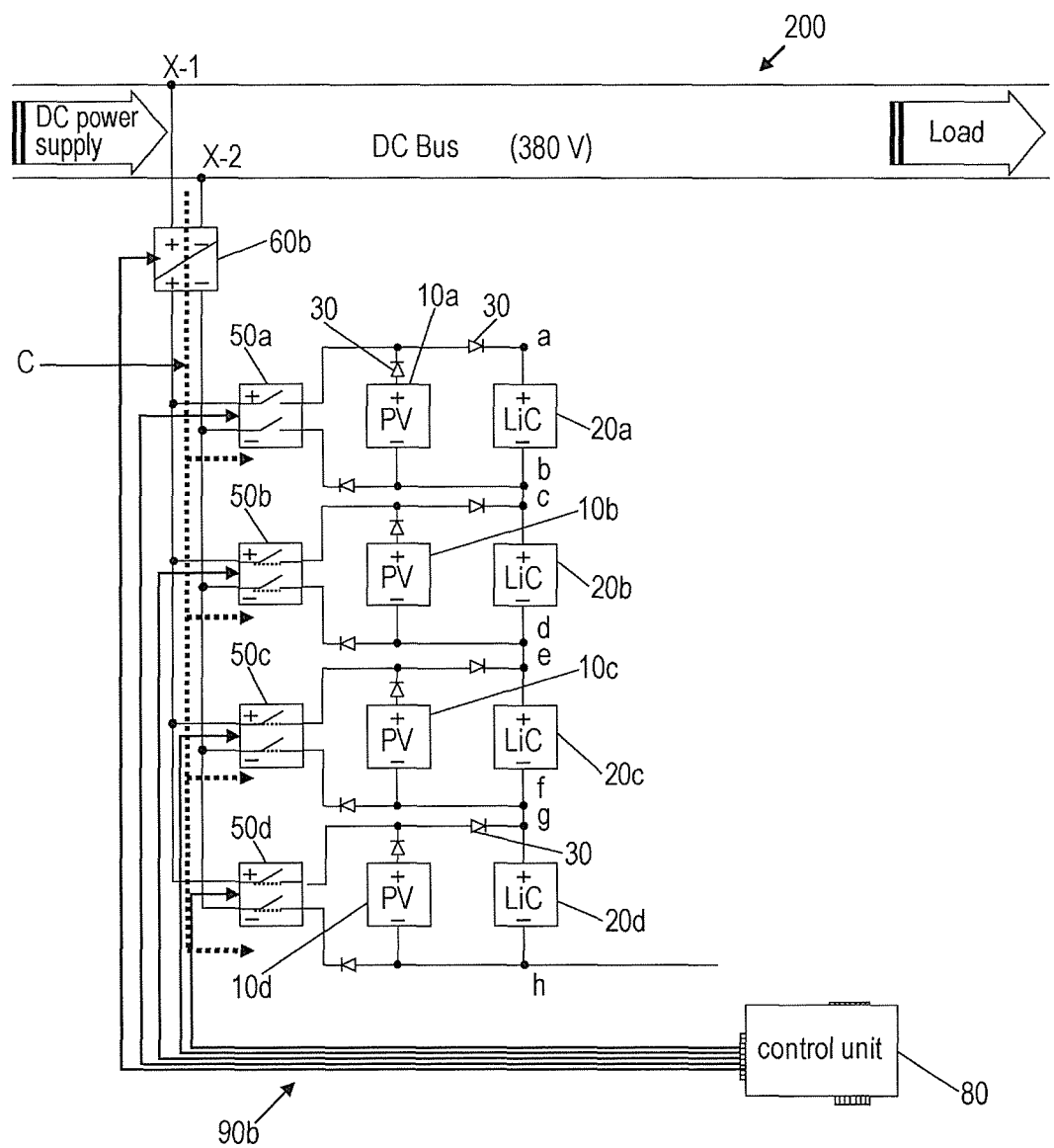
FIG. 8E is a circuit diagram of a power supply apparatus connected to a photovoltaic power generation apparatus.

In FIG. 8E, the LiCs 20*a* to 20*d* complement their voltage imbalance. The first thing to note is that the selector switches 50*a* to 50*d* are respectively connected to the LiCs 20*a* to 20*d*. That is, the selector switch 50*a* is connected between connection points "a" and "b" through two diodes 30, the selector switch 50*b* is connected between connection points "c" and "d" through two diodes 30, the selector switch selector switch 50*c* is connected between connection points "e" and "f" through two diodes 30, and the selector switch 50*d* is connected between connection points "g" and "h" through two diodes 30. Each diode 30 is disposed at a position indicated in FIG. 8D; the forward direction is as indicated in FIG. 8D.

The selector switches 50*a* to 50*d* are connected to the converter 60*b*, which is connected to the bus 200, through a common line. The control unit 80 detects the inter-terminal voltages of the LiCs 20*a* to 20*d* through connection points "a" to "h".

In this structure, as described above, while detecting the inter-terminal voltages of the LiCs 20*a* to 20*d* through connection points "a" to "h", if the control unit 80 recognizes that there is a variation in the inter-terminal voltages of the LiCs 20*a* to 20*d*, the control unit 80 turns on corresponding any of the selector switches 50*a* to 50*d* through the control line 90*b* and drives the converter 60*b* through the control line 90*b*.

In this case, if, for example, the inter-terminal voltage of the LiCs 20*b* to 20*d* is lower than the inter-terminal voltage of the LiC 20*a*, the selector switches 50*b* to 50*d* corresponding to the LiCs 20*b* to 20*d* are sequentially turned on as indicated by the dotted lines and the converter 60*b* is driven.

Thus, the electric power, on the bus 200, which has been converted by the converter 60*b*, is sequentially stored in the LiCs 20*b* to 20*d* through the selector switches 50*b* to 50*d*, as indicated by the dotted lines indicated by the arrow C. In this case, the diodes 30 on the same sides as the positive sides of the PVs 10*b* to 10*d* prevent currents from flowing into the PVs 10*b* to 10*d*. When the inter-terminal voltage of each of the LiCs 20*b* to 20*d* becomes equal to the inter-terminal voltage of the LiC 20*a*, the selector switches 50*b* to 50*d* are turned off as indicated by the solid lines and the driving of the converter 60*b* is stopped.

Thus, since the imbalance of the LiCs 20*a* to 20*d*, which are mutually connected in series, is complemented, it is possible to suppress a voltage drop between connection points "a" to "h" due to a drop in the charging capacity of any one of the LiCs 20*a* to 20*d*. Although, in the above, a case has been discriminated in which an inter-terminal voltage of the LiCs 20*b* to 20*d* is lower than the inter-terminal voltage of the LiC 20*a*, another case has been determined in which the inter-terminal voltage of the LiC 20*a* is lower than an inter-terminal voltage of the LiCs 20*b* to 20*d*. In this case, the turned-on/off states of the selector switch 50*a* and the selector switches 50*b* to 50*d* are reversed; only the selector switch 50*a* is turned on.

Figure 8F:
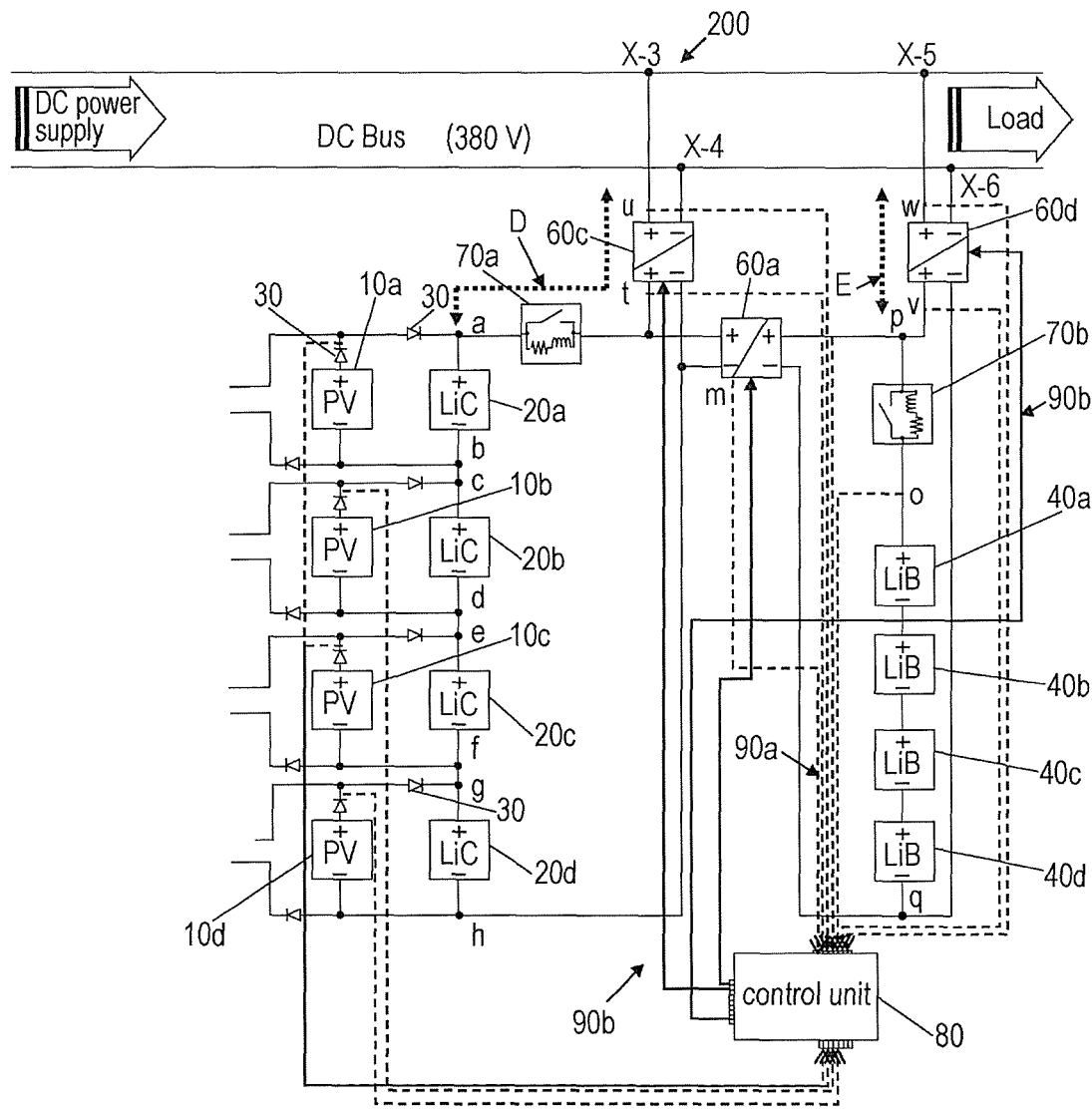
FIG. 8F is a circuit diagram of a power supply apparatus connected to a photovoltaic power generation apparatus.

In FIG. 8F, the converts 60*c* and 60*d* and the like can be used to perform demand adjustment (voltage variation balancing) for the bus 200. That is, the converter 60*c* is connected between connection point "a" of the LiC 20*a* and connection point "h" of the LiC 20*d*. The protective circuit 70*a* is disposed between the positive terminal side of the LiC 20*a* and the positive terminal side of the converter 60*c*. The converter 60*d* is connected between connection point "p" of the LiBs 40*a* and connection point "q" of the LiBs 40*d*. The protective circuit 70*b* is disposed between the positive terminal side of the LiBs 40*a* and the positive terminal side of the converter 60*d*.

The converter 60*d* to be connected to the bus 200 is connected to the output side of the converter 60*a*. The control unit 80 detects a direct-current voltage (DC 380V, for example) on the bus 200 through connection points "x-3" to "x-6".

In this structure, if the control unit 80 detects a direct-current voltage (for example, DC 380V) on the bus 200 through connection points "x-3" to "x-6", the control unit 80 drives the converter 60*c* or converter 60*d* through the control line 90*b*.

That is, although the voltage (for example, DC 380V, which is the stipulated voltage) on the bus 200 varies depending on the operation state of a load (not illustrated), the voltage on the bus 200 is preferably stabilized to transmit a stable voltage to the load. Accordingly, if the bus voltage drops due to an increase in load electric power, the control unit 80 detects that the voltage on the bus 200 is lower than the stipulated voltage, and drives the converter 60c through the control line 90b.

In this case, the converter 60c converts the direct-current voltage from, for example, the LiCs 20a to 20d to a prescribed direct-current voltage, supplying electric power to the bus 200 as indicated by the dotted lines indicated by the arrow D. It suffices for the value of the prescribed direct-current voltage described here to be a value by which variations of the voltage on the bus 200 are kept within stipulated voltages and a current output to the bus falls within a stipulated range.

If the voltage on the bus 200 becomes higher than, for example, DC 380V for some reason, the direct-current voltage on the bus 200 is converted to a prescribed direct-current voltage by the converter 60c or converter 60d and the converted voltage is stored in the LiCs 20a to 20d or LiBs 40a to 40d as indicated by the dotted lines indicated by the arrow D. It suffices for the prescribed direct-current voltage described here to be, for example, a value which is about the rated input voltage of the LiCs 20a to 20d or LiBs 40a to 40d and by which a current flowing in the LiCs 20a to 20d or LiBs 40a to 40d falls within a prescribed range.

Since the LiCs 20a to 20d have particularly high charge and discharge responsiveness and high charge and discharge efficiency as described above, although it depends on the response speed of the converter 60c, the LiCs 20a to 20d can instantly stabilize voltages to some extent even against an instant voltage change on the bus 200.

Furthermore, the control unit 80 can drive the converter 60d in the same way as for the converter 60c. In this case, if the voltage on the bus 200 is lower than the stipulated voltage, the direct-current voltage from, for example, the LiBs 40a to 40d is converted to a prescribed direct-current voltages by the converter 60d and electric power is supplied to the bus 200 as indicated by the dotted line indicated by the arrow E. It suffices for the value of the prescribed direct-current voltage described here to be, as described above, a value by which variations of the voltage on the bus 200 are kept within stipulated voltages and a current output from the LiBs 40a to 40d falls within a stipulated range.

If the voltage on the bus 200 is higher than, for example, DC 380V, the direct-current voltage on the bus 200 is converted to a prescribed direct-current voltages by the converter 60d and the converted voltage is stored in the LiBs 40a to 40d as indicated by the dotted line indicated by the arrow E. It suffices for the prescribed direct-current voltage described here to be, for example, a value which is about the rated input voltage of the LiBs 40a to 40d and by which a current flowing in the LiBs 40a to 40d falls within a prescribed range.

[3] Third Embodiment

A third embodiment is a case in which the power generation apparatus is a vehicle.

Figure 9:
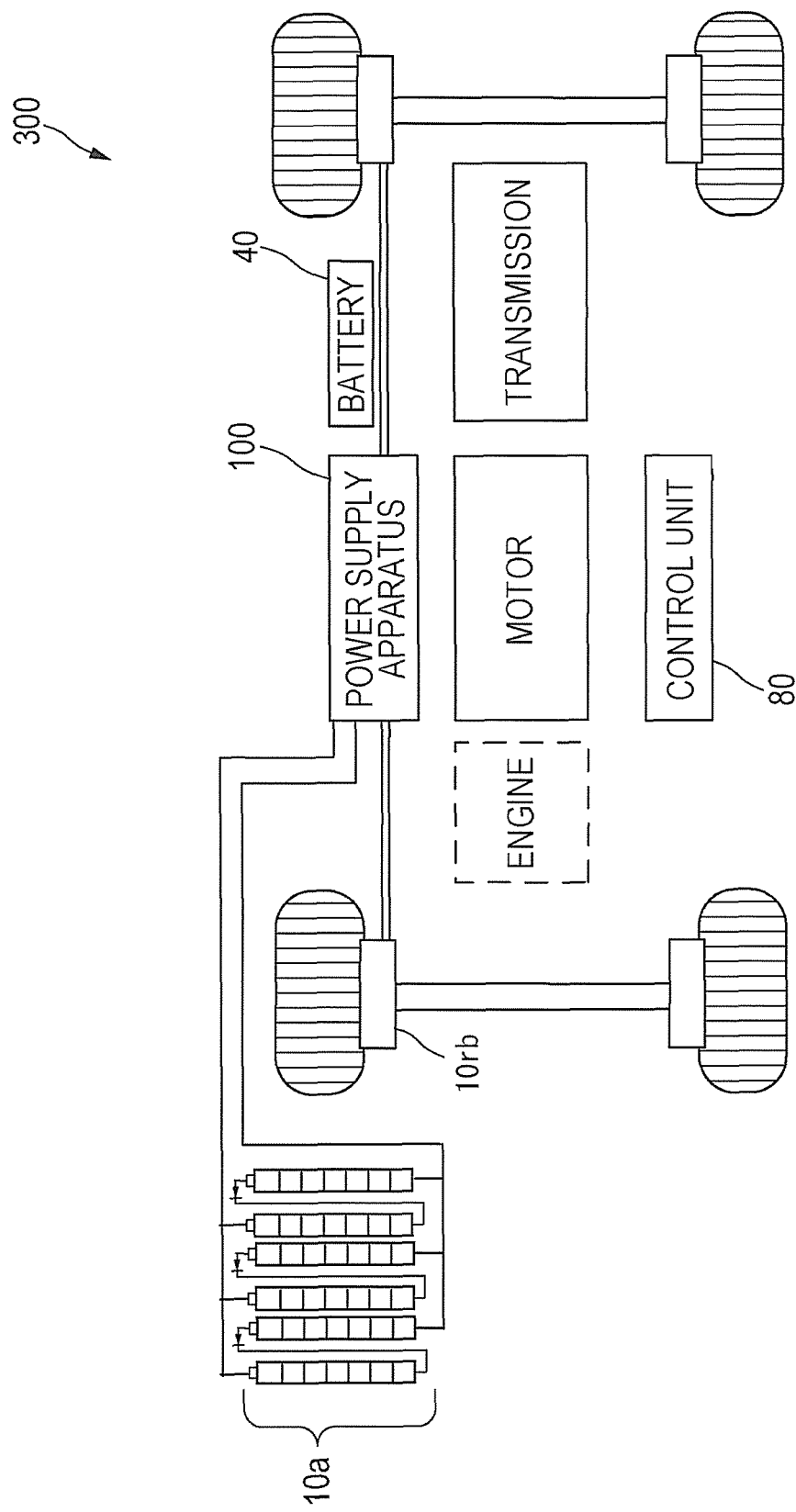
FIG. 9 illustrates an example of a structure in a case in which a power supply apparatus is applied to a vehicle.

FIG. 9 illustrates an example of a structure in a case in which a power supply apparatus is applied to a vehicle. The vehicle 300 illustrated in FIG. 9 has a structure including four tires, a motor, a transmission, and other components required for a hybrid vehicle (in this case, an engine is included) or an electric vehicle, and also has the power supply apparatus 100, the battery 40, the PV 10a, and a regenerative brake 10rb. The PV 10a, which is mounted on, for example, on the hood of the vehicle, may be a plurality of modules 10b and 10c, instead of a single module.

The regenerative brake 10d generates electric power when the vehicle 300 stops, so it is a power source with a varying output. Since the vehicle 300 operates and stops, its output is large, so the electric power of the power supply apparatus 100 also changes for the motor. As a result, the power supply apparatus 100 frequently repeats a charge and discharge cycle. Since, however, a loss is not easily generated by the charge and discharge cycle due to very high charge and discharge efficiency of the power storage devices of the power supply apparatus 100, and the control unit 80 controls the output from the power storage devices instead of a discharge from the battery 40. Accordingly, even if the number of cycles is large, it is possible to prevent the battery from being wasted. Even when large torque is required to, for example, start or stop rapidly, an instant response is made possible by the high input/output responsiveness of the power storage devices. When idling is stopped, the control unit 80 can also control electric power supply from the battery 40 to the power storage devices.

Figure 10:
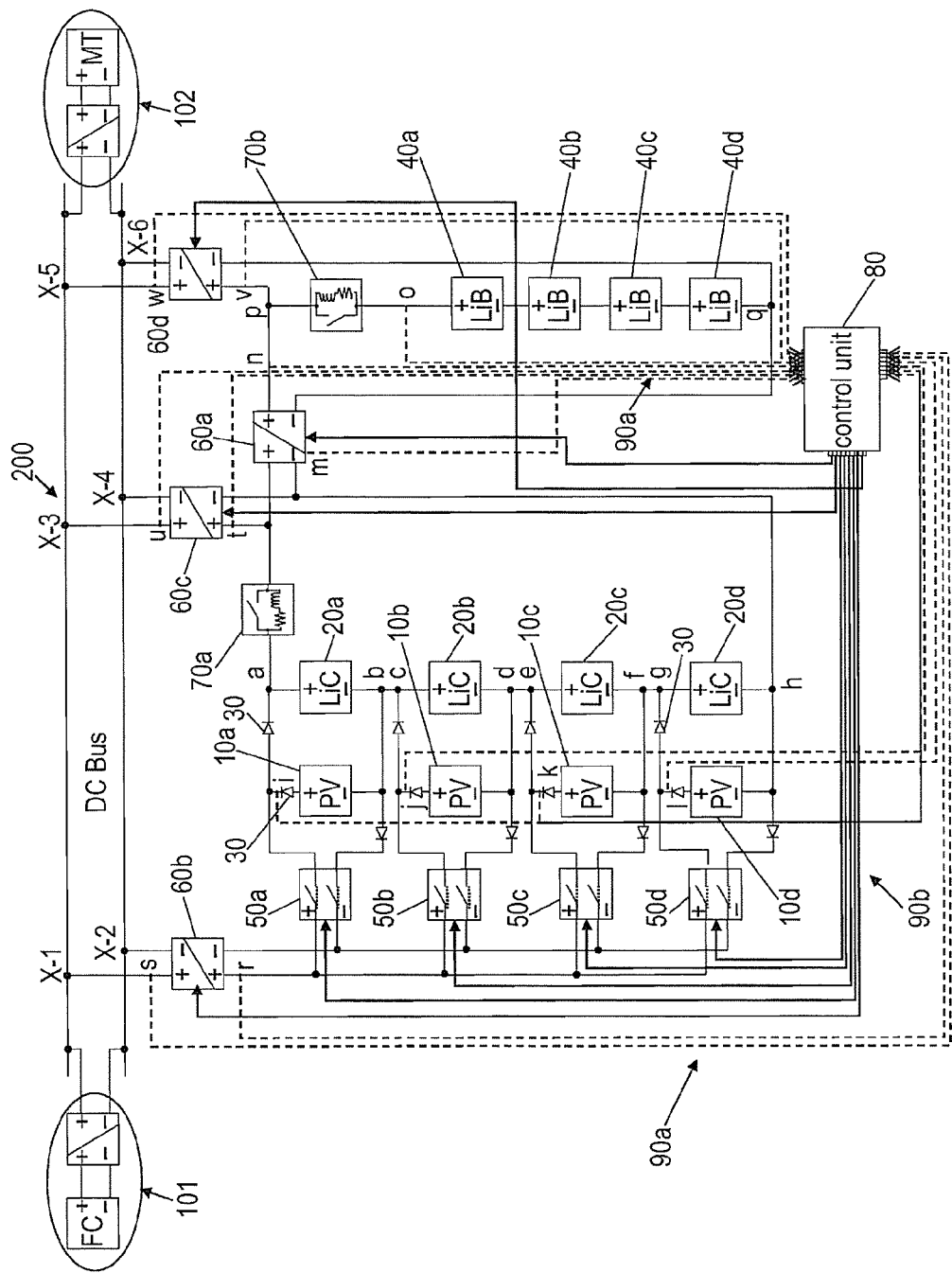
FIG. 10 is a circuit diagram that illustrates a case in which the power supply apparatus is applied to another power source.
Figure 11:
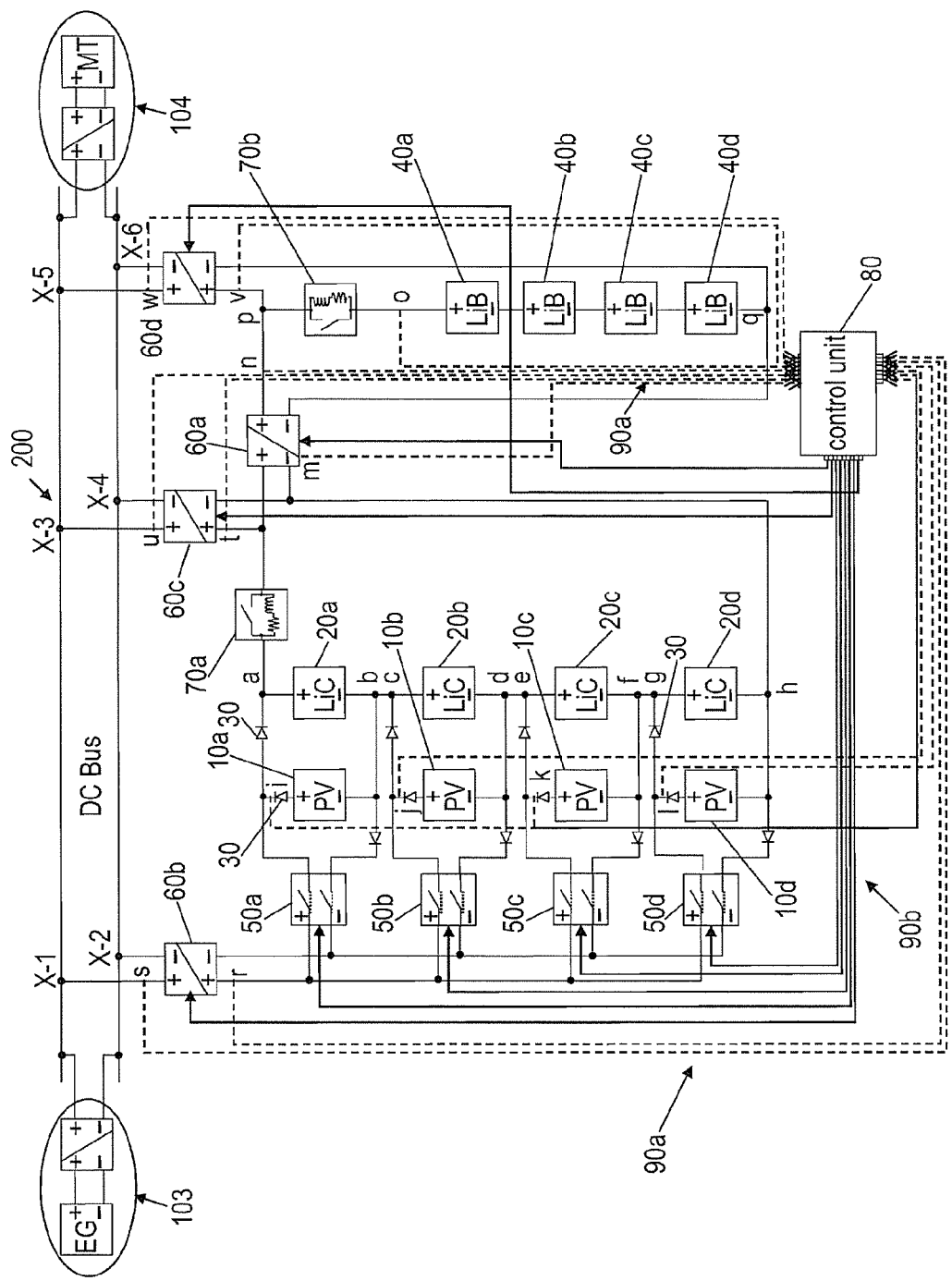
FIG. 11 is a circuit diagram that illustrates a case in which the power supply apparatus is applied to another power source.

FIGS. 10 and 11 each are a circuit diagram that illustrates a case in which the power supply apparatus is applied to a power source the output of which is constant. In the case of a vehicle, when the power supply apparatus of the present invention is connected to the bus 200 between a fuel cell (FC) system 101 and a motor (MT) system 102 as illustrated, for example, in FIG. 10, demand adjustment for the bus 200 (the balancing voltage variations) can be made according to the operation state of the motor system 102.

In the case of a ship, when the power supply apparatus of the present invention is connected to the bus 200 between a diesel engine (EG) system 103 and a motor (MT) system 104 as illustrated, for example, in FIG. 11, demand adjustment for the bus 200 (the balancing voltage variations) can be made according to the operation state of the motor 104.

Although the embodiments of the present invention have been described in detail, it should be understood that the various changes, substitutions, and alterations could be made hereto without departing from the spirit and scope of the invention.

The invention claimed is:
1. A power supply apparatus that receives electric power from a power generation apparatus having a varying output and supplies electric power to an outside, the power supply apparatus comprising:
a power storage device that has a larger amount by which electric power is stored and/or a lower self-discharge rate than a capacitor device used as a passive device and also has higher charge and discharge efficiency and/or higher responsiveness than a secondary battery, the power storage device receiving electric power from the power generation apparatus and discharging electric power to the outside;
a current control unit that controls a current supplied from the power storage device to the outside; and
a control unit that controls a current and a voltage of the power generation apparatus by charging and discharging the power storage device, so as to maximize an amount of power generation by the power generation apparatus,
wherein the power supply apparatus comprising:
a first to an n-th power storage devices, wherein n is a natural number larger than or equal to 2,
wherein the first power storage device is connected in parallel to a first power generation apparatus, the n-th power storage device is connected in parallel to a n-th power generation apparatus,
the first to n-th power storage devices are mutually connected in series, and
the first to n-th power generation apparatuses are mutually connected in series through a diode.

2. The power supply apparatus according to claim 1, comprising:
a first current sensor that measures input and output currents of the power storage device;
a first voltage sensor that measures a voltage of the power storage device; and
a second current sensor that measures a current of the power generation apparatus; wherein
the control unit uses the first voltage sensor and the second current sensor to calculate electric power of the power generation apparatus and controls the current control unit so as to maximize electric power from the power generation apparatus.

3. The power supply apparatus according to claim 1, wherein
the power storage device is a lithium-ion capacitor.

4. The power supply apparatus according to claim 1, wherein
the power generation apparatus is a photovoltaic power generation apparatus or a wind power generation apparatus.

5. The power supply apparatus according to claim 1, wherein in a situation that electric power consumed by an external load is larger when compared with the power generation apparatus, the control unit causes the power storage device to performs discharging to the external load; and
in a situation that electric power consumed by an external load is smaller when compared with the power generation apparatus, the control unit causes the power storage device to charge an external secondary battery.

6. The power supply apparatus according to claim 1, wherein
the current control unit is connected between a positive terminal of the first power storage device and a negative terminal of the n-th power storage device, the first power storage device and the n-th power storage device being connected in series, the current control unit converting a voltage between the positive terminal and the negative terminal to a prescribed voltage; and
the control unit controls a conversion operation performed by the current control unit according to a change in the voltage between the positive terminal and the negative terminal.

7. The power supply apparatus according to claim 6, wherein
a plurality of battery devices, which are connected in series, are connected to an output end of the current control unit; and
electric power from the first to n-th power storage devices is stored in the plurality of battery devices according to the conversion operation performed by the current control unit.

8. The power supply apparatus according to claim 1, wherein
a first selector switch is connected between terminals of the first power storage device;
an n-th selector switch is connected between terminals of the n-th power storage device;
a first voltage converting unit is connected to the first to n-th selector switches, the first voltage converting unit converting a voltage on a bus to a prescribed voltage;
the control unit turns on and off each of the first to n-th selector switches according to a variation in an inter-terminal voltage of the each of the first to n-th power storage devices, and controls a conversion operation performed by the first voltage converting unit; and
electric power converted by the first voltage converting unit is stored through the first to n-th selector switches, which have been turned on, in the corresponding first to n-th power storage devices.

9. The power supply apparatus according to claim 8, wherein
a second voltage converting unit is connected between the positive terminal of the first power storage device and the negative terminal of the n-th power storage device, the second voltage converting unit converting the voltage between the positive terminal and the negative terminal to a prescribed voltage and converting the voltage on the bus to a prescribed voltage;
a third voltage converting unit is connected to both ends of the plurality of battery devices connected in series, the third voltage converting unit converting a voltage between the both ends to a prescribed voltage and converting the voltage on the bus to a prescribed voltage;
the control unit controls a conversion operation performed by the second voltage converting unit and/or the third voltage converting unit according a variation in the voltage on the bus; and
charging and discharging are performed in the first to n-th power storage devices and/or the plurality of battery devices until the voltage on the bus is stabilized.

10. A battery apparatus, comprising:
the power supply apparatus according to claim 1; and
a battery device that stores electric power output by the power supply apparatus.

11. A battery system, comprising:
the power supply apparatus according to claim 1; and
a photovoltaic power generation apparatus or a wind power generation apparatus connected to the power supply apparatus.

12. A battery system, comprising:
the power supply apparatus according to the battery apparatus according to claim 10; and
a photovoltaic power generation apparatus or a wind power generation apparatus connected to the power supply apparatus.

* * * * *